(12) United States Patent
Wozniak

(10) Patent No.: US 10,812,654 B2
(45) Date of Patent: Oct. 20, 2020

(54) INTERACTIVE VOICE RESPONSE SYSTEM DESIGN, DEVELOPMENT AND TESTING TOOL

(71) Applicant: AT&T Intellectual Property I, L.P., Atlanta, GA (US)

(72) Inventor: Louis Wozniak, Carmel, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 48 days.

(21) Appl. No.: 16/023,031

(22) Filed: Jun. 29, 2018

(65) Prior Publication Data

US 2020/0007680 A1 Jan. 2, 2020

(51) Int. Cl.
*H04M 3/493* (2006.01)
*H04M 3/24* (2006.01)

(52) U.S. Cl.
CPC ........... *H04M 3/493* (2013.01); *H04M 3/242* (2013.01); *H04M 2201/42* (2013.01); *H04M 2203/355* (2013.01)

(58) Field of Classification Search
CPC .. H04M 3/242; H04M 3/493; H04M 2201/42; H04M 2203/355
USPC ......... 379/88.01–88.28, 201.01, 67.1–88.28; 709/201–207, 217–248
See application file for complete search history.

(56) References Cited

U.S. PATENT DOCUMENTS

| | | | | |
|---|---|---|---|---|
| 6,055,369 A * | 4/2000 | Sawahata | ................... | G06F 8/34 717/109 |
| 6,173,266 B1 * | 1/2001 | Marx | ...................... | G10L 15/22 704/270 |
| 6,173,437 B1 * | 1/2001 | Polcyn | ............... | H04Q 3/54583 379/908 |
| 6,192,108 B1 * | 2/2001 | Mumford | .............. | H04M 3/242 379/10.03 |
| 6,321,198 B1 * | 11/2001 | Hank | ................... | H04M 3/4936 704/270 |
| 6,826,745 B2 * | 11/2004 | Coker | .................... | G06Q 30/02 707/999.003 |
| 7,127,046 B1 * | 10/2006 | Smith | ............... | H04M 3/42204 379/88.03 |
| 7,397,905 B1 | 7/2008 | Stewart et al. | | |
| 7,406,626 B2 * | 7/2008 | Shen | ........................ | G06F 8/31 709/219 |
| 7,492,874 B2 | 2/2009 | Plan | | |

(Continued)

OTHER PUBLICATIONS

Anveo; "Powerful Visual IVR Call Flow." www.anveo.com. Last Accessed Jun. 29, 2008. 3 pages. https://www.anveo.com/business/features.asp?code=ivrcallflow.

(Continued)

*Primary Examiner* — Hemant S Patel
(74) *Attorney, Agent, or Firm* — Amin, Turocy & Watson, LLP

(57) ABSTRACT

Example embodiments relate to a tool for design, development, and testing (DDT) of interactive voice response systems. The DDT tool can also receive data representative of an interactive voice response call flow, such as data representative of an interactive voice response call flow diagram, and determine whether an error in the interactive voice response call flow is present. The DDT tool can also accept a test case script insert, which can be inputted into the call flow diagram, and can generate test case script comprising the test case script insert.

20 Claims, 16 Drawing Sheets

(56) References Cited

U.S. PATENT DOCUMENTS

| | | | | |
|---|---|---|---|---|
| 7,734,470 | B2* | 6/2010 | Natesan | H04M 3/4938 379/88.22 |
| 7,881,440 | B2* | 2/2011 | Castillo | G06F 11/3604 379/112.08 |
| 8,155,959 | B2* | 4/2012 | Weng | G10L 15/22 379/267 |
| 8,533,670 | B2* | 9/2013 | Dye | G06F 8/34 717/113 |
| 8,576,991 | B2* | 11/2013 | Geldenbott | H04M 3/36 379/45 |
| 8,582,725 | B2 | 11/2013 | Sharma | |
| 8,670,972 | B1* | 3/2014 | Varman | G06F 11/3664 703/24 |
| 8,717,915 | B2 | 5/2014 | Dubut et al. | |
| 8,831,208 | B2* | 9/2014 | Suendermann | H04M 3/4936 379/265.11 |
| 9,160,854 | B1* | 10/2015 | Daddi | H04M 3/5175 |
| 9,430,194 | B1* | 8/2016 | Childs | G06F 8/34 |
| 10,212,283 | B1* | 2/2019 | Gao | H04M 3/28 |
| 2003/0037119 | A1* | 2/2003 | Austin | H04L 29/06 709/217 |
| 2003/0212561 | A1* | 11/2003 | Williams | H04M 3/24 704/270.1 |
| 2005/0234725 | A1* | 10/2005 | Agapi | H04M 3/493 704/260 |
| 2006/0155526 | A1 | 7/2006 | Castillo et al. | |
| 2007/0003037 | A1* | 1/2007 | Agapi | H04M 3/323 379/142.18 |
| 2007/0071220 | A1 | 3/2007 | Weldon et al. | |
| 2008/0112542 | A1* | 5/2008 | Sharma | H04M 3/242 379/1.02 |
| 2008/0126098 | A1* | 5/2008 | Deng | H04M 3/36 704/270.1 |
| 2009/0041215 | A1 | 2/2009 | Schmitt et al. | |
| 2011/0293077 | A1* | 12/2011 | Dubut | H04M 3/493 379/88.04 |
| 2013/0070911 | A1* | 3/2013 | O'Sullivan | H04M 1/645 379/88.04 |
| 2013/0204834 | A1* | 8/2013 | Forsee, II | H04M 3/493 706/52 |
| 2015/0237200 | A1* | 8/2015 | Geldenbott | H04M 3/36 379/45 |
| 2015/0350443 | A1* | 12/2015 | Kumar | H04M 3/5232 379/265.13 |
| 2016/0050317 | A1* | 2/2016 | Natesan | H04M 3/4936 379/88.01 |
| 2016/0080571 | A1* | 3/2016 | Castillo | G06F 17/28 379/88.01 |
| 2016/0198045 | A1 | 7/2016 | Kulkarni et al. | |
| 2016/0227034 | A1* | 8/2016 | Kulkarni | H04M 3/493 |

OTHER PUBLICATIONS

Callfire. "The IVR Designer." www.callfire.com. Last Accessed Jun. 29, 2018. 5 pages. https://www.callfire.com/help/docs/the-ivr-designer.

Pronexus. "IVR Solutions: Build." www.pronexus.com. Last Accessed Jun. 29, 2018. 1 page. http://www.pronexus.com/ivr-solutions-provider-pronexus/ivr-build.

Tannerezell. "Installing CUCM Publisher in VMware." www.youtube.com. Last Accessed Jun. 29, 2018. 1 page. https://www.youtube.com/watch?v=K5fu7i1mfBE.

Plum Voice. "Fuse+: Visualize A Better Customer Experience." www.plumvoice.com. Last Accessed Jun. 29, 2018. 5 pages. https://www.plumvoice.com/products/plum-fuse/.

* cited by examiner

605

Error Analysis | Errors: 204 | Last Run: 0 hr ago | Re-Run | Hide Errors in Flow | Help

| Node Type | Errors | Tools |
|---|---|---|
| Choice | No outgoing path (18) | |
| Decision | Must have 2 or more outgoing paths to Results (4)<br>No incoming path (1) | |
| Goto | Cannot have outgoing path (1)<br>No incoming path (2)<br>No reachable target (17) | Fix Start, Goto, and Gosub nodes |

• • •

305

Errors also indicated in flow

*English Prompts to Record:*

805

| Phase ID | Copy to | Phrase |
|---|---|---|
| 1000 | 4050,4060 4100,4150 4200,4360 4700,4750 9504,9507 9510,4000 | You have reached the Federal Emergency Management Agency |
| 1003 | | We have a website where you can create an account. There, you can apply for disaster assistance, send and receive documents, and check the status of your application. The Website is www dot Disaster Assistance dot gov and is accessible by computer, tablet or smartphone. |
| Spanish/ 1000 | | Usted se ha communicado con la Agencia Federal de gestión de emergencias |

810

| Unit | Grade | ID | Phrase |
|---|---|---|---|
| 320: Transfer Unit Continued 2 | 5.7 | 3212 | Please hold for the next available agent. |
| 320: Transfer Unit Continued 2 | 11.2 | 3213 | This call may be monitored and recorded for quality assurance purposes. |
| 320: Transfer Unit Continued 2 | 8.4 | 3211 | ...minutes |
| 320: Transfer Unit Continued 2 | 5.7 | 3208 | Please hold for the next available agent. |
| 320: Transfer Unit Continued 2 | 11.2 | 3209 | This call may be monitored and recorded for quality assurance purposes. |

MS Excel Spreadsheet – Prompt Artifacts

815

| | A | B | C | D |
|---|---|---|---|---|
| 1 | Type | Unit_Name | Phrase ID | Phrase |
| 2 | Static | Select Language | 1000 | You have reached the Federal Eme |
| 3 | FSU | Select Language | 1003 | |
| 4 | Static | Select Language | spanish/1000 | Usted se ha communicado con la |
| 5 | Static | Select Language | spanish/1002 | Para persona que hablen espanol |
| 6 | FSU | Select Language | spanish/1003 | Tenemos un sitio web donde se: |

| Log Entry | In Call Flow | In Right Unit | In Right Order | Notes |
|---|---|---|---|---|
| UNIT:100:Select Language | ✓ | ✓ | - | |
| MODULE:MS-Select Language | ✓ | ✓ | ✓ | |
| MARKER:M050-89 | ✓ | ☐ | - | Warning: Should be in Previous Unit 50 |
| MARKER:M100-00 | ✓ | ✓ | ✓ | |
| PROMPT: 1000 | ✓ | ✓ | ✓ | |
| PROMPT: spanish/1000 | ✓ | ✓ | ✓ | |
| UNIT : 101 : Get Zip Code | ✓ | ✓ | - | |
| PROMPT : 1003 | ✓ | ☐ | - | Warning: Should be in Previous Unit 100 |
| MODULE: MS-Get Zip Code | ✓ | ✓ | ✓ | |
| MARKER: M100-01 | ✓ | ☐ | - | Warning: Should be in Previous Unit 100 |

FIG. 11

INTERACTIVE VOICE RESPONSE SYSTEM DESIGN, DEVELOPMENT AND TESTING TOOL

TECHNICAL FIELD

The present application relates generally to the field of interactive voice response systems and, more specifically, to a tool for design, development, and testing of interactive voice response systems.

BACKGROUND

An interactive voice response (IVR) system is a computing system that can enable a caller (e.g., caller identity) that calls the IVR system to select options from a voice menu presented to the caller and to interact with the IVR system. Generally used as the front end of call centers, an IVR attempts to identify which service the caller desires, and to provide service to the customer by either providing information, performing services, or directing calls. IVR systems can be used to provide information and services, such as telephone banking transactions, bill payment, order placement, balance inquiries, and booking (airline/hotel/can rental, etc.) confirmations, travel information, weather conditions, etc.

IVR systems can also be used to facilitate caller identification and call routing, which can be useful in directing calling party entities to a sales representative, account representative, technical support representative, etc.

A typical IVR system plays a pre-recorded voice prompt to elicit information from the caller. The IVR system can receive numeric information (such as account numbers, personal identification numbers (PINs), etc.). The caller can press a number on a telephone keypad to select an option (e.g., "press 1 for yes, press 2 for no."). Some IVR systems can also recognize the caller's speech. For example, an IVR system can recognize a spoken answer such as "yes," "no," or a number as a valid response to the voice prompt. As another example, an IVR system can recognize words that are spoken such as "account balance" or "representative." Based on the user's response, answers (which can be pre-recorded information, such as directions to a location, or customized information such as an account balance) can be provided to the caller, services can be performed, and calls can be directed to other departments or service representatives.

IVR systems can become very complicated when they include menu choices that result in multiple layers in depth, retrieval of information from multiple databases, dozens of prompts, etc. As such, the design, development, and testing for a customized implementation of an IVR system can become tedious, burdensome, and wrought with errors.

The above-described background relating to IVR systems is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 8 illustrates displays that comprise an example artifact, the displays generated by an artifact generator module of the DDT tool, in accordance with various aspects and example embodiments of the subject invention.

FIG. 11 illustrates an application log report that can be generated by an app log scanner module, in accordance with various aspects and example embodiments of the present invention.

DETAILED DESCRIPTION

Figure 1:
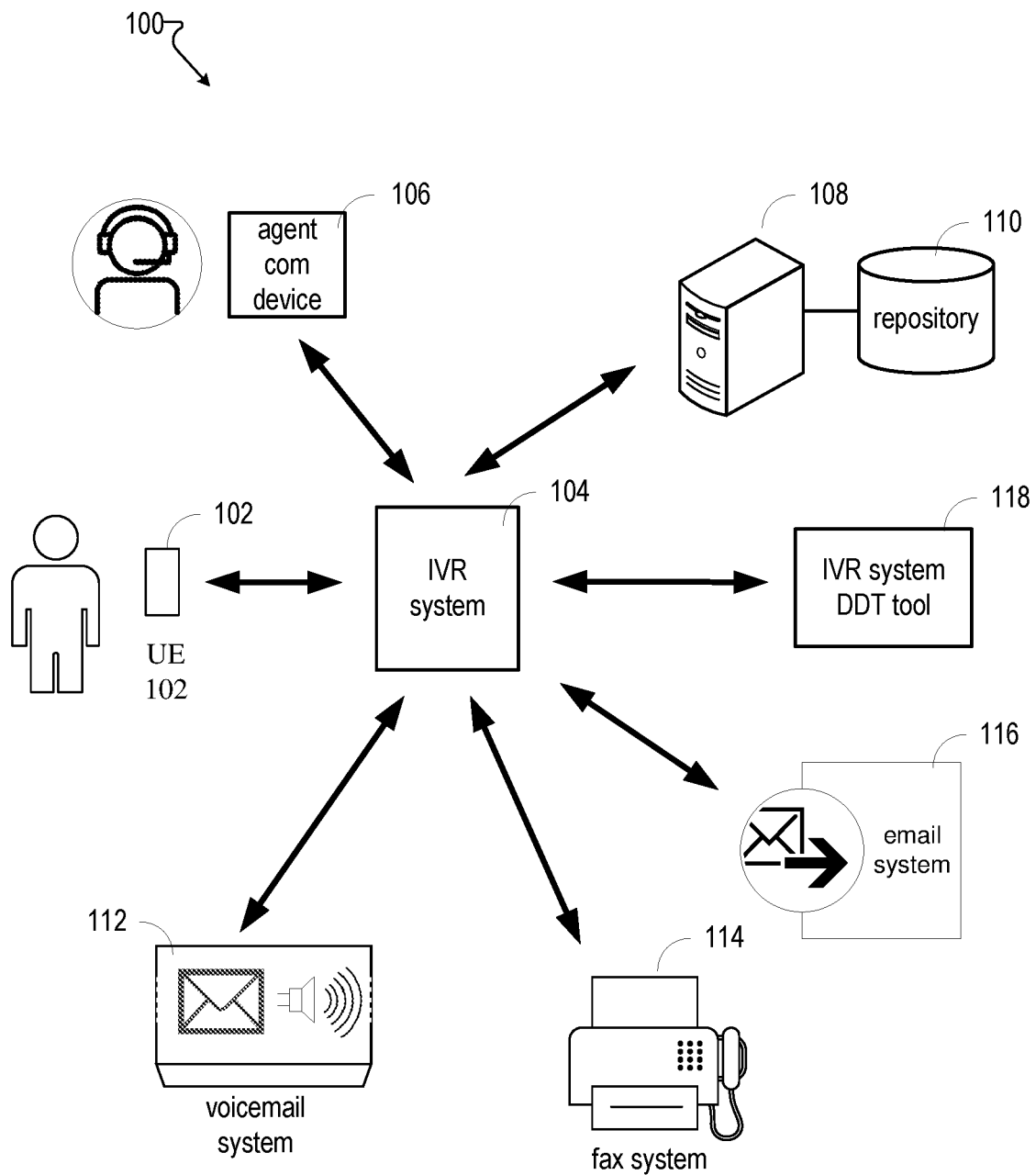
FIG. 1 illustrates an example environment 100 in which an example DDT tool in accordance with various aspects and example embodiments of the present invention can be implemented.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by a device (e.g., one or more devices) comprising programmable processors that execute machine executable instructions (e.g., computer code, computer program product, computer-readable instructions, software, software programs, software applications, software modules, etc.) to facilitate performance of the operations described herein. Examples of such a device, or devices, can comprise circuitry and components as described in FIG. 15 and FIG. 16.

The systems, devices, and methods, in accordance with various aspects and example embodiments of the present invention described herein provides for an interactive voice response system (IVR), also referred to by some as voice response unit (VRU)) system design, development, and testing DDT tool. Typically, the development of IVR systems begins with the design, by designers, of IVR call flows that relate to the options that can be presented to a caller by an IVR system, the options that can be presented to a caller in response to the caller's inputs, as well as the processes performed by the IVR system. These call flows are typically shown in a diagram using any shape, color, connectors, etc. desired by the designer. The diagram can be created using a stand-alone diagramming software (e.g., software that can be used to generate graphics and drawings), such as, for example, the Microsoft Visio product, or other similar commercially available drawing programs (e.g., Autocad, Cadkey, MicroStation, PowerPoint, LucidChart, ASCIIFlow Infinity, Gliffy, yEd Graph Editor, Graphviz, LibreOffice Draw, Dia, Draw.io, Pencil Project, etc.). The diagram is then handed off to programmers (e.g., software programmers, computer coders, etc.) who must visually read the call flow charts, and then write computer code that implements the call flow in the IVR system. Testers (tester identities) and quality assurance personnel test the IVR system to find errors and undesired results, or to improve or facilitate the caller's interactive experience with the IVR, providing feedback to the designers as needed.

Among other features, the present application provides for a variety of features that can reduce the amount of time used for design, coding, and testing of IVR systems, assisting designers, programmers and testers (collectively referred to herein as developers) and facilitating their interactions in implementing an IVR system. As a result, accuracy during development of IVR systems can be increased, and time to implementation of IVR systems can be decreased. Example embodiments of the DDT tool can simulate an IVR flow, so that customers implementing the IVR system can understand and approve the IVR application before any code is ever written or generated. The DDT tool can be used to detect errors in the call flow before any code is written or generated. Moreover, the DDT tool can automatically generate a listing of a particular artifact, such as recorded prompt scripts and CATO-required reading level test results. Additionally, the DDT tool can be used to insert markers associated with paths of a call flow, wherein the markers enable an IVR system to determine the number of times a call has been directed though the path associated with the marker. The DDT tool can also enable the insertion of test case script inserts that can be included in script readable by an IVR testing bot.

FIG. 1 illustrates an example environment 100 in which an example DDT tool in accordance with various aspects and example embodiments of the present invention can be implemented. The environment 100 can comprise a UE 102 and an IVR system 104. The environment 100 can further comprise, connected (either directory or indirectly) to the IVR system 104, an agent communication device 106, a server 108 (with a repository 110 attached thereto), a voice-mail system 112, a fax system 114 (e.g., facsimile messaging system), an email system 116, and an IVR system design, development, and the testing (DDT) tool 118.

One or more user equipment, for example UE 102, can communicate with the IVR system 104. UE 102 can comprise, for example, any type of device that can communicate via a mobile network, as well as other networks. The UE can be any telephony device that can allow a caller (e.g., caller identity) to establish a communication with the IVR system 104. The UE 102 can comprise a plain old telephone server (POTS) phone. The UE 102 can also comprise a telephone connected to broadband telephony modem (modem embedded with a voice over internet protocol (VoIP) adapter). The broadband telephony modem can be, for example, a cable modem, DSL modem, etc., through which a UE 102 can connect and make voice calls over a fixed packet network that delivers broadband.

The UE 102 can also comprise a mobile handset (e.g., mobile handset 1500) having one or more antenna panels with vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a C-V2X client device associated with (e.g., integrated with, inside of, embedded in, mounted upon, etc.) a vehicle (e.g., motor vehicle, such as a car, van, bus, truck, etc.), and the like. UE 102 can also comprise IOT devices that communicate wirelessly.

A caller can use the UE 102 to make calls to a call destination, and an IVR system 104 can answer the call. The IVR system 104 can be deployed, for example, as equipment installed on a customer premises, equipment installed in a communications network (e.g., private branch exchange (PBX), public switched telephone network (PSTN), etc.). The IVR system 104, after answering the call, can play announcements, or request an input from the caller through a prompt. In typical IVR systems, the caller can make selections on his or her UE 102's keypad, which can lead to the generation of dual tone multifrequency (DTMF) tones that can be used by the IVR system 104 to interpret the caller's response to the voice prompts. As an example, a caller can use the keyboard to press the "1" button, which sends a DTMF signal corresponding to "1."

Inputs can also be in the form of the caller's voice, and the IVR can have speech recognition capabilities. As an example, a caller can read out pins, account numbers, May "yes" or "no," or indicate whether he or she wishes to speak to a customer service representative by saying "representative," or "agent."

The IVR system 104 can comprise automated attendant functionality, such that the information input by the caller can be used to route the call to an agent or representative (e.g., agent communication device 106 operated by an agent identity, or representative) that can handle the caller's issue.

The IVR system 104 can be coupled to one or more computing devices, such as a server 108, that can access information stored in one or more repositories, such as repository 110 (which can be an internal, external, or networked storage device). The information can comprise a variety of information sought by a caller, or the information can be used in conjunction with the fulfillment of product purchases and services. Such information can comprise user account information, billing information, purchase information, product information, travel information, lodging information, address information, and any other type of information that a caller into an IVR system might seek. While not depicted in the FIG. 1, the server 108 can be integrated with other systems (e.g., shipping, reservation, warehousing, etc.) that might facilitate the fulfillment of products or services to a customer.

Still referring to FIG. 1, the IVR system 104 can also be connected to (or comprise the functions of) a voicemail system 112, such that one of the IVR system 104's branches can allow a caller to leave a voice message that might be related to the issue about which the caller is calling. The IVR system 104 can also be coupled to a fax system 114, or an email system 116. These systems can be operable to transmit information to a caller based on the caller's call. As an example, one of the menu choices of the caller can lead to a selection in which the caller's airline reservation is sent to the caller's email address, which might be an email address stored in a user account in a repository (e.g., repository 110).

Other technologies of the IVR system 104 comprise using text-to-speech technology to speak to a caller dynamic information, such as e-mails received through an email system 116, a fax message received via the fax system 114 and OCR'd (e.g., optical character recognition), news reports, or weather information, including from a web-based system (not shown in FIG. 1).

The IVR system 104 can be connected to DDT tool 118, in accordance with various aspects and example embodiments of the present invention.

Figure 2:
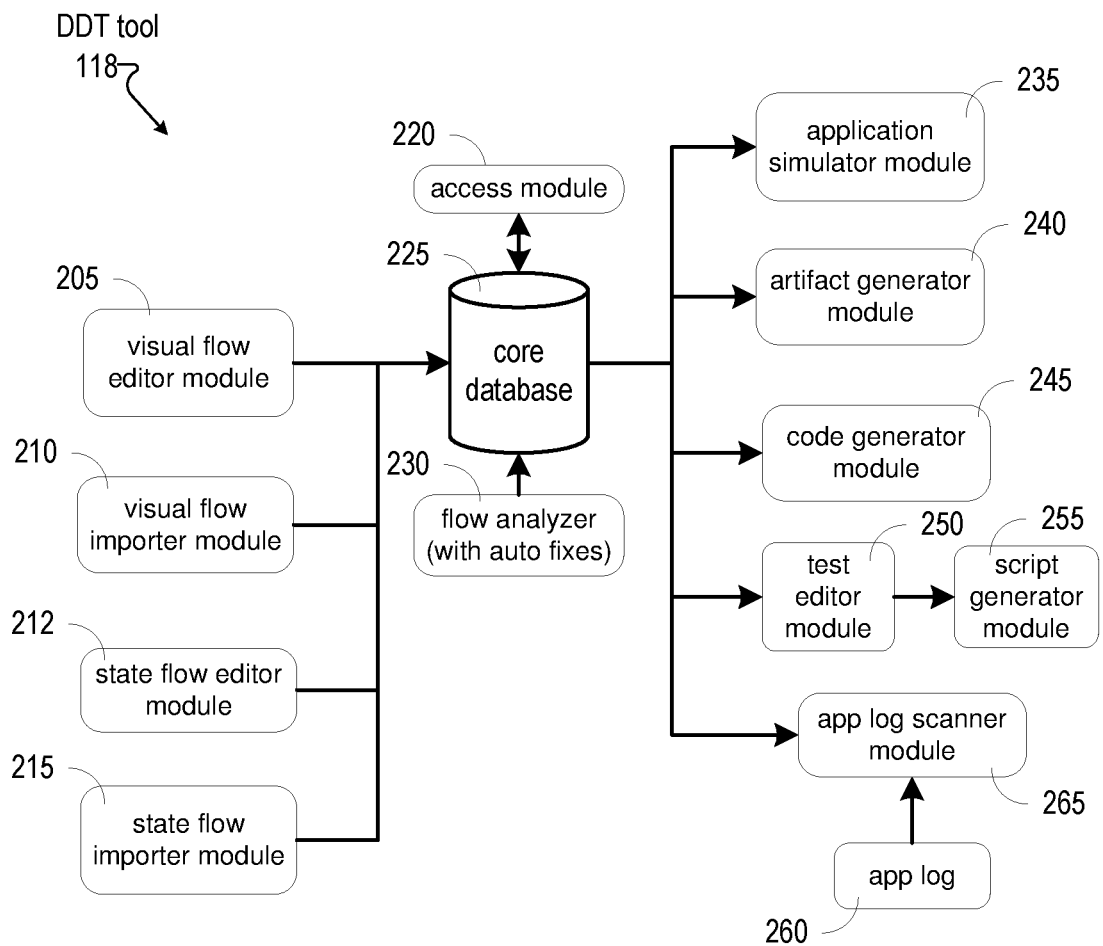
FIG. 2 illustrates examples of modules of a DDT tool, in accordance with various aspects and example embodiments of the present invention.

FIG. 2 illustrates a block diagram showing example modules of a DDT tool 118, in accordance with various aspects and example embodiments of the present invention. The DDT tool 118 can be implemented as a device (e.g., one or more devices) comprising programmable processors that execute machine executable instructions (e.g., computer program product, computer-readable instructions, software, software programs, software applications, software modules, etc.) to facilitate performance of the operations described herein. The DDT tool 118 can comprise a visual flow editor module 205, a visual flow importer module 210, a state flow importer module 215, an access module 220, a core database 225, a flow analyzer module 230, an application simulator module 235, an artifact generator module 240, a code generator module 245, a test editor module 250, a script generator module 255, an application log module 260, and an application log scanner module 265. Each of these modules are described below.

Figure 3:
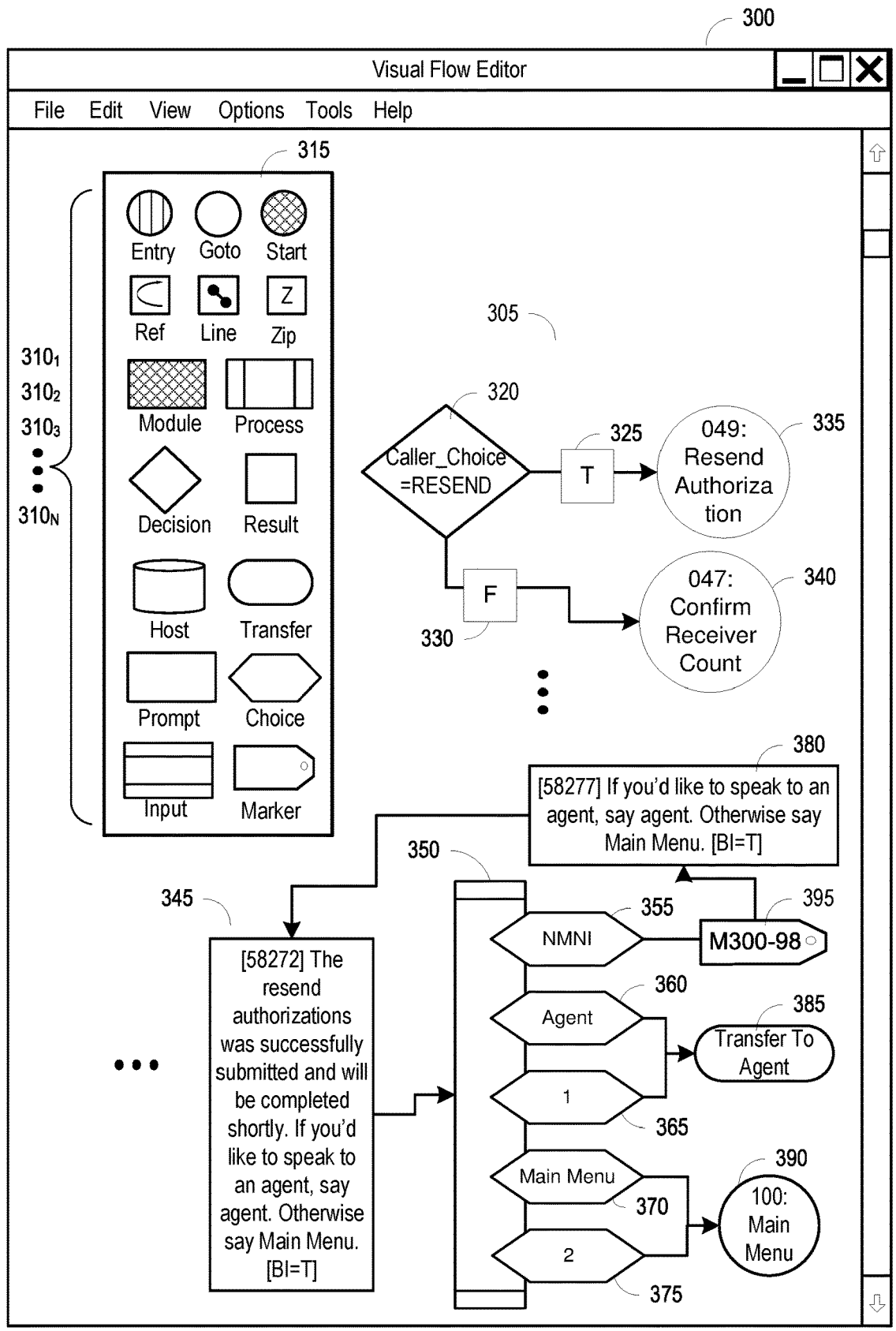
FIG. 3 illustrates an example graphical user interface that can be generated by a visual flow editor module of the DDT tool, in accordance with various aspects and example embodiments of the present invention.

Referring now to FIG. 3, the DDT tool 118 can comprise a visual flow editor module that allows for the creation (e.g., by a designer, designer identity) of a call flow diagram that can be read and processed by the DDT tool 118. Data representative of the call flow diagram can be used to generate computer code can be loaded into an IVR system (e.g., IVR system 104), which implements the IVR call flow detailed in the call flow diagram. FIG. 3 shows an example visual flow editor graphical user interface (GUI) 300 (e.g., program interface, web application interface, etc.) that can be generated by the visual flow editor module 205. The visual flow editor GUI 300 can be a window, a webpage, or some other application interface. In example embodiments, the visual flow editor module 205 of the present invention allows a designer to create a call flow diagram (e.g., call flow diagram 305) in which shapes, also referred to herein as nodes (e.g., nodes $310_{1-N}$, where "N" represents some number), and connectors, are input by a designer. The designer can use, for example, the visual flow editor GUI 300 to create the call flow diagram 305. As illustrative examples, an electronically generated on-screen visual flow editor palette 315 can contain nodes $310_{1-N}$ representative of different IVR call flow nodes. The nodes can appear as icons in the visual flow editor palette 315. In example embodiments, nodes $310_{1-N}$ can represent a process, prompt, decision, result, input, choice, marker etc. nodes, with each type of node being represented by a different shape, color/shading, style. A designer can select nodes $310_{1-N}$, and connectors to connect the nodes $310_{1-N}$, from the visual flow editor palette 315. The nodes $310_{1-N}$ can be selected by the designer (e.g., with an input device such as a mouse, stylus, or finger if touch-sensitive) and placed into the call flow diagram 305. The contents (e.g., text) inside each node can also have an associated function, state, or meaning, and can also comprise the data elements. The designer can select connectors to connect the nodes $310_{1-N}$, wherein the connectors between each shape also have a meaning and relate to IVR call flow. The call flow diagram 305 can be stored as data elements. The data elements representative of the nodes, states, processes, flows, and node text of the call flow diagram 305 can be electronically stored (e.g., stored in a repository such as core database 225), and the data elements can be electronically accessed (e.g., accessed by an access module 220, which can provide an application interface to store and retrieve the data elements) and processed (e.g., analyzed by flow analyzer module 230). The call flow diagram data can be interpreted by the DDT tool 118, and used to facilitate the generation of IVR computer code, which can be loaded into a machine-readable medium of an IVR system (e.g., IVR system 104), resulting in the call flows and functionalities embodied in the call flow diagram being implemented by the IVR system 104. Thus, the visual flow editor module 205 of the DDT tool 118 is more exacting than a drawing created by a diagramming software application, which would require a live person to look at it, review it, and perform coding based upon the drawing.

For illustrative purposes, call flow diagram 305 depicts only portions of a call flow diagram. An IVR call flow however, can have hundreds of call flow nodes $310_{1-N}$, but space constraints on this patent drawing allows for the illustration of only a few nodes. A typical call flow can have 50-100 pages, and each page has approximately 40 nodes. Call flow diagram 305 depicts various nodes $310_{1-N}$ inserted into the call flow diagram 305. In example embodiments, a decision node (e.g., Caller_Choice=RESEND node 320) is a non-user input node that can be inserted by selecting and placing a diamond-shaped node from the visual flow editor palette 315, and can represent an assessment of a state, status, count, presence (or absence) of one or more values or data elements retrieved from a database, etc. (e.g., whether an item is in stock, etc). A decision node can comprise logical "if" determinations, and can include boolean operations (e.g., if account balance is "low" and "minimum payment=late," . . . . In the example shown in FIG. 3, the Caller_Choice=RESEND node 320 is representative of an evaluation of whether a caller choice to resend was present. In example embodiments, a decision node can be attached to a result node, representative of a determination of a presence or absence of a state, status, or a count (e.g., determining, for example, whether a data element is present). In the example call flow diagram 305, the call flow moved to result node "T" 325 in response to a determination that a caller's choice was to provide a resend request. The result node "T" 325 thus represents a "True" value, which can mean that the state was present (e.g., the caller chose to resend). In call flow diagram 305, the call flow moved to result node "F" 330 in response to a determination that a caller's choice was to provide a resend request. The result node "F" 330 thus represents a "False" value, which can mean that the state was absent, or not present (e.g., the caller chose not to resend). Although a "T" or "F" is used to represent the presence or absence of a decision state, other designations can be used to represent the results of a decision, such as "Y" or "N" indicating "Yes" or "No" wherein "Yes" indicates presence, and "N" indicates absence. Binary terms can be used, such as a "1" or "0" wherein "1" represents presence, and "0" represents absence. "P" or "N" can also be used to represent result nodes, wherein "P" indicates "Positive" and "N" indicates negative, wherein "Positive" indicates presence, and "Negative" indicates absence. In example embodiments, result nodes can be attached go-to nodes, presentative of an IVR call flow destination, an action, a process, or some other part of the IVR call flow. A specific go-to node for a particular process, for example, can be inserted whenever that particular process is desired to be performed. In call flow diagram 305, the resend authorization go-to node 335 follows the result node "T" 325. The resend authorization go-to node represents a process, or "unit" in which an authorization is resent. If any other branches of the IVR call flow performs an authorization resend, due to either a positive or negative result, the resend authorization go-to node 335 can be inserted as the go-to node that follows such a result. In call flow diagram 305, the go-to node that follows the result node "F" is the confirm receiver count node 340.

The confirm receiver count node 340 can be used as the go-to node whenever a confirm receiver count process is desired to be performed.

Other nodes in call flow diagram 305 can include prompt nodes. Prompt nodes can provide users with information, can also recite a prompt to a caller, asking for an input. For example, prompt node 345 informs the caller "The resend of authorizations was successfully submitted and will be completed shortly." The prompt node 45 also prompts the user to either say "agent" or press "1" on his or her UE, or if caller wishes to go to the main menu, the caller is prompted to say "main menu" or press "2" on his or her UE. Connected to a prompt node can be an input node. The input node represents the IVR system waiting for the user to provide input (e.g., type something into a keypad, speak a command, or enter input in some other fashion). A shape representative of an input node can be, in example embodiments, a long, gray vertical bar, as shown in call flow diagram 305 as input node 350. Matched and connected to input nodes can be choice nodes, which are nodes that are representative of the potential inputs that callers make, in response to a prompt node. For example, the choice nodes in the call flow diagram 305 are the no match no input (NMNI) choice node 355, the Agent choice node 360, the choice node "1" 365, the Main Menu choice node 370, and the choice node "2" 375. The NMNI choice node 355 corresponds to either no input from the user, or an input from the user that does not match any of the other acceptable choices (that is, if the caller entered a response, or spoke a response, that did not ask for an agent, main menu, or input a "1" or "2" into the phone indicating that the caller wants to speak with an agent, or would like to return to the main menu). The Agent choice node 360 corresponds to a call flow input in which a caller responds to the prompt by speaking "agent." The choice node "1" 365 corresponds to a call flow input in which a caller indicates that he or she would like to speak with an agent by inputting a "1" using his or her UE (e.g., mobile phone, landline phone). The Main Menu choice node 370 corresponds to a call flow input in which a caller responds to the prompt by speaking "main menu." The choice node "2" 375 corresponds to a call flow input in which a caller that would like to hear the main menu options responds to the prompt by inputting a "2" using his or her UE (e.g., phone).

The choice nodes can be connected to other nodes. For example, the NMNI choice node 355 can be connected to another prompt node, such as prompt node 380, which, having received either no response from the caller, or a response that did not match any of the other choice nodes, might inform the user "we didn't get that," or "please make your selection again." In the example call flow diagram 305, prompt node 380 prompts the user to either say "Agent" or press "1" on his or her UE, or if caller wishes to go to the main menu, the caller is prompted to say "main menu" or press "2" on his or her UE. The Agent choice node 360 or the choice node "1" 365 can be connected to a go-to node, such as the Transfer to Agent node 385. The Transfer to Agent node 385 represents a process whereby the caller's call is routed to an agent. Similarly, the Main Menu choice node 370 and the choice node "2" 375 can be connected to the Main Menu node 390, which is a go-to node that corresponds to the presentation to the caller (e.g., caller's UE) of the Main Menu options.

Another node selectable and insertable from visual flow editor palette 315 is a marker node (e.g., NMNI marker 395). A marker node, when inserted into the call flow diagram 305 and processed by the DDT tool 118, allows a count of the number of times a caller encounters the placed marker (e.g.

the number of times a caller has chosen, or has been directed, through the branch (e.g., call flow path)) having that marker associated with the branch or path. With markers in place, every time a caller proceeds down a path where the marker has been placed, the caller triggers the marker, and when the marker is triggered, a count is recorded.

If an IVR system (e.g., IVR system 104) has been operational for a month, for example, the system may have had 10,000 callers using the IVR system. If a marker was placed in branches, or paths, of an IVR call flow in which an agent or representative (e.g., live attendant) was asked for, the marker can indicate how many times an agent has been requested by the IVR callers. In this scenario, if there are hang-ups (e.g., obstacles, impediments, ambiguities, etc.) in the IVR call flow, prompts, or menu selections, the markers can be informative as to where there was a problem, including a problem resulting in an agent being asked for. Being able to develop an IVR call flow in which the number of times an agent is asked for by a caller can be important, as live attendants require higher costs on the part of the business entity employing the IVR system.

In the example shown in FIG. 3, the NMNI marker 395 enables the DDT tool 118 to be operable to count the number of times a caller provides either a response that does not match a system option, or provides no input (e.g., NMNI, no match, no input). Obtaining information regarding the number of times a caller has been down a branch of an IVR flow can provide information that can be useful to developers. In this example, if a significant or large number of callers of an IVR system have traveled down the branch marked by NMNI marker 395, this can be an indication that perhaps the wording of prompt node 345 was unclear, ambiguous, or not heard clearly. With this information, a developer can diagnose issues. In this example, a designer might work with, for example, an audio team to re-record the audio file related to prompt node 345 to be more understandable, so as to decrease the number of callers that have been directed through the NMNI call flow. In example embodiments, a chart can be generated by the DDT tool 118 showing each marker and information related to each marker, including the name or identification of the marker, the location of the marker in the IVR flow, how many times the marker was encountered by callers, as well as the percentage of time that callers encountered the marker.

The examples described above with respect to FIG. 3 are illustrative of certain types of nodes made available via the DDT tool 118, but other types of nodes and connections can be constructed and used to implement other states, prompts, and functions. Again, a call flow diagram generated by the visual flow editor module can be read and processed by the DDT tool 118, and can be used to generate computer code that is installed and implemented in an IVR system (e.g., IVR system 104).

Figure 4:
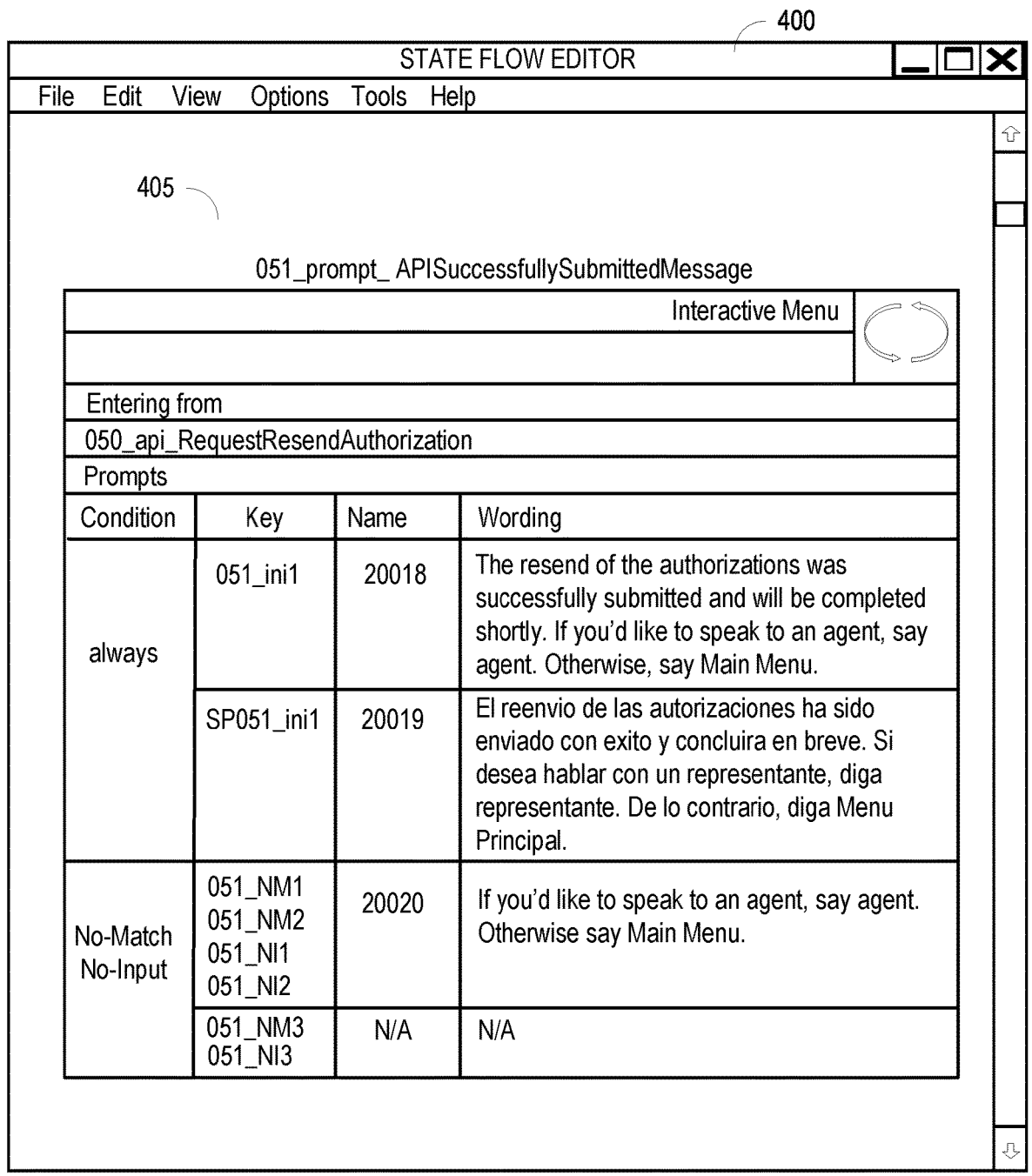
FIG. 4 illustrates an example graphical user interface that can be generated by a state flow editor module of the DDT tool, in accordance with various aspects and example embodiments of the present invention.

Moving on to FIG. 4, in example embodiments, the DDT tool 118 can have a state flow editor module 212 that allows a designer to work with state tables (or charts) to create an IVR call flow, or portions of an IVR call flow. In example embodiments, the state table can be read and processed by the DDT tool 118, and can be used to generate computer code that is ultimately implemented in an IVR system (e.g., IVR system 104). FIG. 4 shows an example state flow editor graphical user interface (GUI) 400 (e.g., program interface, web application interface, etc.) that can be generated by the state flow editor module 212. The state flow editor GUI 400 can be a window, a webpage, or some other application interface. In example embodiments, the state flow editor module 212 of the present invention allows a designer to create a state table with IVR call flow details (e.g., state table 405), for example, the name of the node, wording of a prompt, connection information, condition, etc., and other details that can be used by the DDT tool 118 to generate computer code (e.g., XML code) representative of the call flow, which can loaded into an IVR system (e.g., IVR system 104).

In example embodiments, the DDT tool 118 allows for the use of both the visual flow editor module 205 to generate call flow diagrams, and the use of state flow editor module 212 to state tables. The resulting call flow diagrams and state tables can be used to generate portions of the software code for IVR call flow. Thus, the resulting software can have software code that stemmed from call flow diagrams, as well as state tables. This way, a designer more familiar with designing IVR call flows using a state table (e.g., state table 405) can work with state tables, while a designer more familiar with using a call flow diagram (e.g., call flow diagram 305) to design an IVR call flow can work with call flow diagrams. One designer can work on one part of the IVR call flow using the flow diagram, another designer can work on another part of the IVR call flow using the state chart.

Figure 5A:
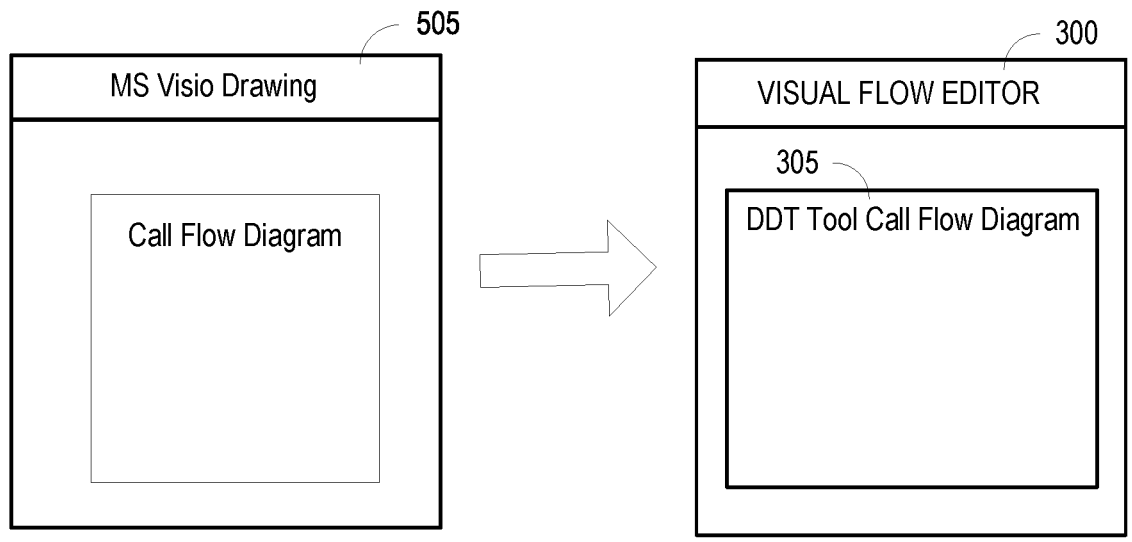
FIG. 5A illustrates the import of a diagram created by a diagramming software by a visual flow importer module of the DDT tool, in accordance with various aspects and example embodiments of the present invention.

FIG. 5A illustrates the functioning of the visual flow importer module 210 of the DDT tool 118. The visual flow importer module 210 can receive as an input a graphical diagram 505 of a visual call flow. The diagram can be created using a stand-alone diagramming software (e.g., software that can be used to generate graphics and drawings), such as, for example, the Microsoft Visio product, or other similar commercially available drawing programs (e.g., Autocad, Cadkey, MicroStation, PowerPoint, LucidChart, ASCIIFlow Infinity, Gliffy, yEd Graph Editor, Graphviz, LibreOffice Draw, Dia, Draw.io, Pencil Project, etc.). The visual flow importer module 210 receives the graphical diagram 505, recognizes its shapes, and converts the shapes of the input graphical diagram into a call flow diagram (e.g., call flow diagram 305) usable by the DDT tool 118. As an example, if the visual flow importer module 210 recognizes a diamond shape with text, it then creates the same diamond shape with the same text in the call flow diagram 305. The call flow diagram 305 can then be used to generate computer code that is usable by the IVR system 104 to carry out the call flows. Thus, any designer is able to use a commercially available drawing program to produce a graphical diagram, and the visual flow importer module imports the graphical diagram. In response to the diagram containing shapes and connectors recognizable as having meaning by the DDT tool 118, the DDT tool 118 can uses the imported graphical diagram to create a call flow diagram (call flow diagram 305) having nodes and connectors that are counterparts to the shapes and connectors in the imported graphical diagram.

Figure 5B:
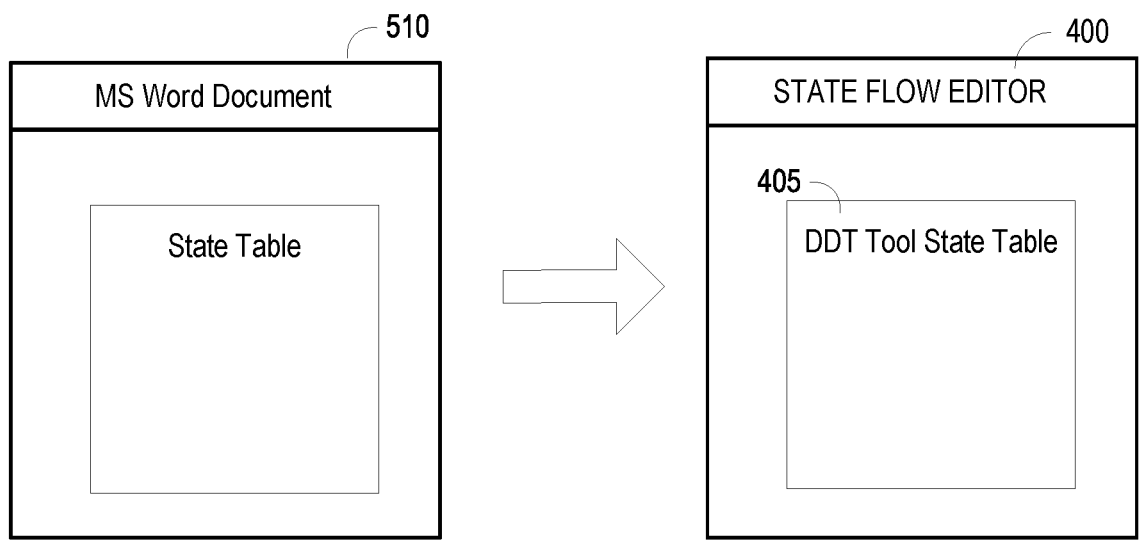
FIG. 5B illustrates the import of a specification document comprising state tables, by the state flow importer module of the DDT tool, in accordance with various aspects and example embodiments of the present invention.

As shown in FIG. 5B, the DDT tool 118 can also have a state flow importer module 215 that allows the DDT tool 118 to import a specification document (e.g., specification document 510) comprising state tables (e.g., a Word document with state tables related to an IVR call flow). The importer module 215 can electronically read the specification document (e.g., including formatting and content) and generate within the state flow editor GUI 400 a state table (e.g., state table 405) comprising information that was contained in the imported specification document.

Additionally, not only can the visual flow importer module 210 create a call flow diagram in the visual flow editor GUI 300 from an imported a graphical diagram, it can also create a state table in the state flow editor GUI 400 from an imported graphical diagram.

Conversely, not only can the state flow importer module 215 create a state table in the state flow editor GUI 400 from an imported specification document (e.g., specification document 510), the state flow importer module 215 can also create a call flow diagram (e.g., call flow diagram 305) in visual flow editor GUI 300 from an imported specification document comprising state tables.

Figure 6:
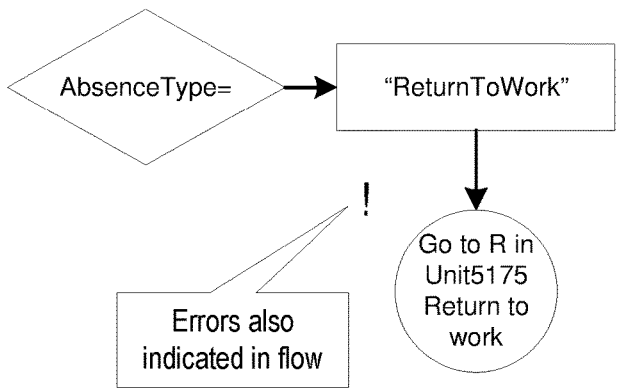
FIG. 6 illustrates example displays that can be generated by a flow analyzer module of the DDT tool, in accordance with various aspects and example embodiments of the present invention.

Now referring to FIG. 6, the IVR system DDT tool 118 can have a flow analyzer module 230 which can be utilized to analyze the elements and flow of a call flow, as specified in a call flow diagram (e.g., call flow diagram 305) or a state table (state table 405), and detect any errors in the diagram, or in the state table. Errors in call flow arise depending on rules that are implemented, and the flow analyzer module 230 can be operable to determine whether all nodes are properly connected according to the rules that are implemented. Rules can be implemented whereby, in example embodiments, go-to shapes are connected to units that exist, no more than two lines are not coming out of a decision node and those lines are attached to results (e.g., two lines, each corresponding to a result node, can be used), go-to nodes do not have any lines coming out of the go-to nodes, results nodes are connected to go-to nodes, prompt nodes do not have multiple lines coming out of them, a decision node cannot be connected to a choice node, an input cannot be connected to a result node, etc. The flow analyzer module 230 can be operable to determine whether rules in the call flow have been violated, and, in response to the violation of a call flow rule, report the error. The error can be reported, for example, in an error chart 605, which lists the type of node to which the error relates, the location of the node, and notes related to the error. A designer can select (e.g., click) on the errors in the chart to expand the error and show more detail. In example embodiments, a user can select an error from the error chart, and the location of the error can be revealed in the call flow diagram (e.g., call flow diagram 305). As show in FIG. 6, the call flow diagram can have an error indicator (e.g., red exclamation point) indicating an error in the call flow. For example, exclamation points can appear where errors require fixing (e.g., next to a bad node or bad connection). In example embodiments, a designer of the call flow can hover over the exclamation marks (e.g., with a mouse), and the error can be displayed (e.g., this go-to node says go to 5175, but 5175 doesn't exist). In example embodiments, the flow analyzer module 230 can also be operable to fix the call flow (e.g., if arrows are in the wrong direction, the call flow analyzer can automatically fix the call flow error by exchanging the direction of the arrows). In similar fashion, a state table can also be analyzed, and errors in the state table detected and indicated.

In example embodiments, after a call flow diagram (e.g., call flow diagram 305) has been created, the flow analyzer module 230 can execute and provide any errors that the flow analyzer module 230 detects in the call flow diagram. In example embodiments, the flow analyzer module 230 can be configured to be operable to generate an error each time a user attempts to connect a node improperly. Each time a designer connects something wrong, it can pop up an error as soon as the designer tries to connect something improper. This generation of errors on an ad-hoc basis can be turned on or off as needed (a designer might know about an error already and doesn't need to be constantly reminded of it; for example, an error might be generated that a unit of a go-to node does not exist, but the designer already knows this and plans on creating the unit). In example embodiments, the call flow analyzer can be running in the background, checking for errors and displaying errors when the errors are encountered.

Figure 7:
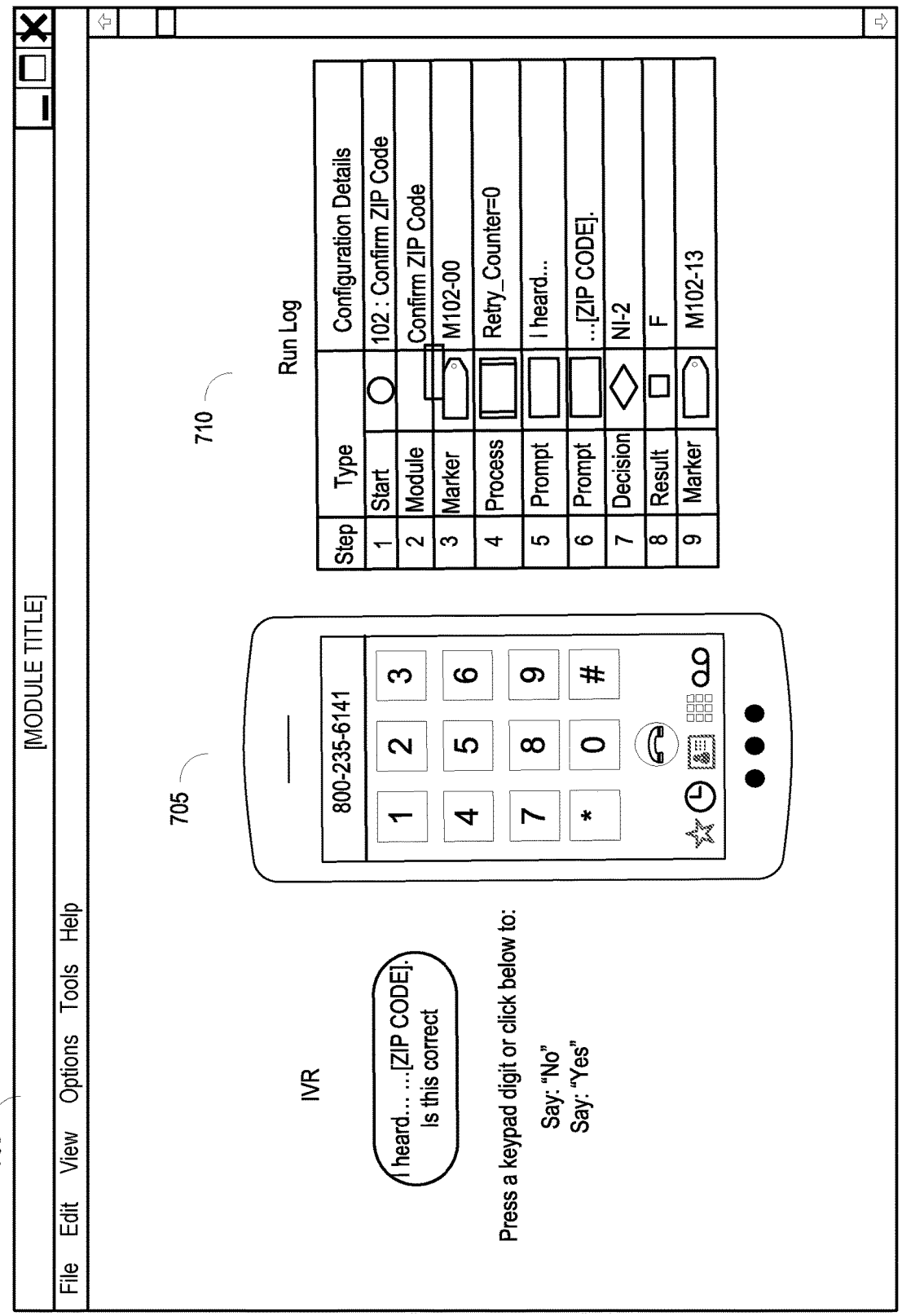
FIG. 7 also illustrates an example image of a user equipment and run log that can be generated by an application simulator module of the DDT tool, in accordance with various aspects and example embodiments of the present invention.

Moving on to FIG. 7, the DDT tool 118 can comprise an application simulator module 235. The DDT tool 118, executing the application simulator module 235, can be operable to generate a simulator interface 700, comprising an image of a UE 705 (e.g., a "virtual" phone). The simulator interface 700 can be displayed on a display device of a computing device. The application simulator module 235 can also be operable to execute the call flow diagram 305, implementing the IVR call flow. In example embodiments, the execution of this call flow is prior to the generation of the computer code that is used in the IVR system 104. Instead of having a tester call up the IVR system using an actual UE device, a tester can instead select, or speak inputs, by operating the image of the UE 705. For example, selecting the number "1" on the image of the UE 705 simulates a DTMF signal that is sent to the executed, simulated IVR call flow. Likewise, when a term is spoken (e.g., saying "agent"), a computing device executing the application simulator module 235 can be operable to receive the sound of that term, recognize the term, and use it as an input into the simulated IVR call flow. Further, the tester is able to see the run log 710, generated on the simulator interface 700, shows the tester the inputs that were put in during the simulation session, a history of which branch of the IVR call flow was tested, which nodes were tested, and where the nodes are located. The application simulator module shows how the call flows would operate if a particular call flow, as embodied in a call flow diagram (e.g., call flow diagram 305), were to be coded. Thus, using the application simulator module 235, the tester can test the IVR call flow prior to the generation of any code, or the implementation of the code on an IVR system 104 (e.g., runs the IVR without the IVR system 104 being coded). Simulator can work with visual flows as well as state flows.

Now referring to FIG. 8, the IVR system DDT tool 118 can comprise an artifact generator module 240. An artifact can refer to an aspect of the IVR system, and the artifact generator module 240 allows each artifact to be viewed and isolated, apart from the entire IVR call flow. For example, all the prompts in the call flow can be viewed (the prompts being the artifact). The viewing of all the audio prompts, and information related to the audio prompts, can assist the members of the design team that are responsible for the prompts—typically an audio recording team whose job it is to create wave files that serve as the prompts in an IVR. The artifact generator module 240 assists by providing a view of only a particular artifact, so that any team members whose primary focus is on that artifact, can view information regarding that artifact only, as opposed to looking at the entire call flow. The view can take the form of, for example, a chart (e.g., prompt artifact chart 805). In this example, the audio team might want to see the prompts because that's the focus of their job, and they are only interested in the prompts artifacts, and other information related to prompts, such as, for example, the Flesch-Kincaid grade level 810 for each prompt. A spreadsheet 815 can also be generated listing information regarding each prompt. A view of just the prompt artifact can allow an audio team to review prompts, re-record prompts (if desired) and send the prompts back to the designers for insertion into the call flow. If the call flows had been made in only a Visio diagram (for example), the audio team would have had to examine the entire flow in the Visio diagram call flow, find all the prompts, copy those prompts into, for example, an excel file, create a form, and send it to the audio recording studio. Further, each time a change in the IVR call flow is made, each spreadsheet would need to be updated. In contrast, in example embodiments of the present invention, views can be generated by the artifact generator module 240 and displayed on, for example, a GUI, to provide artifacts, e.g., certain information useful to a particular designer, tester, or coder that has a particular role, and that particular artifact can be filtered or sorted, so that the designer, tester, or coder can view information related to the artifact of their interest. Other examples of artifacts can comprise a list of all markers and information related to markers, reporting scripts, selected choice inputs, etc.

Figure 9:
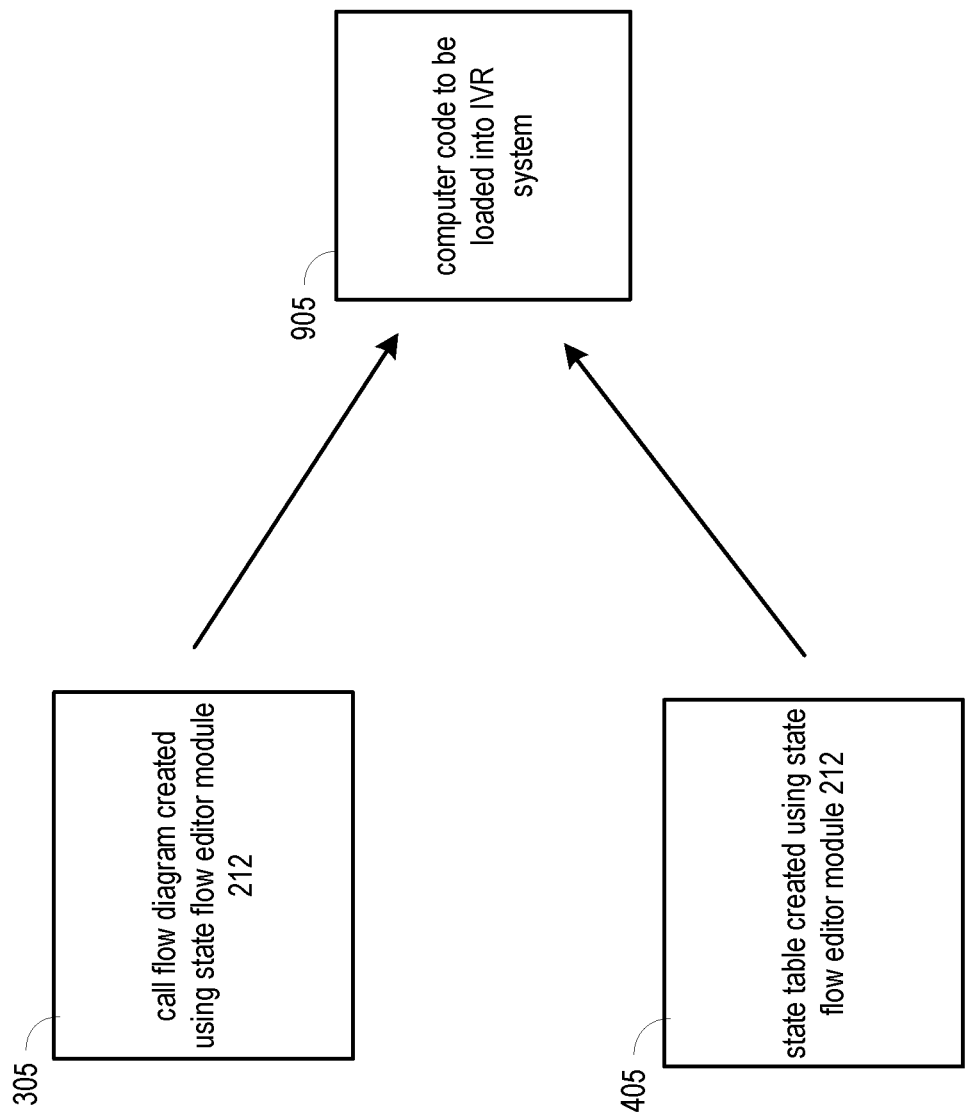
FIG. 9 illustrates the generation, by a code generator module of the DDT tool, of IVR computer code based on a call flow diagram created by a visual flow editor module of the DDT tool, and based on a state table created by a state flow editor module of the DDT tool, in accordance with various aspects and example embodiments of the subject invention.

FIG. 9 illustrates the code generation process, which can be performed, for example, by the code generator module 245. The code generator module 245 can be operable to receive as an input data representative of a call flow diagram (e.g., call flow diagram 305), including its various nodes, markers, etc. The code generator module 245 can read and process this data and generate IVR computer code 905— code that can be loaded into (e.g., stored in memory of) an IVR system (e.g., IVR system 104) and that enables the IVR system to execute the IVR call flows associated with the call flow diagram. In example embodiments, the IVR computer code 905 can be in an XML format (e.g., VXML). Each node of the call flow diagram 305, including markers, can be translated into the IVR computer code 905. The code generator module 245 can also be operable to receive as an input data representative of a state table (e.g., state table 405) created using the state flow editor module 215. The code generator module 245 is operable to receive the language, designations, and formatting contained in the state table 405 to process them and to generate the IVR computer code 905. In example embodiments, a portion of the IVR computer code 905 can be generated from the call flow diagram data, whereas other portions of the IVR computer code 905 can be generated by the state table data. The code generator module 245 can allow the designers with a preference for using state tables to use the state flow editor module 212, and the designers that desire to work with call flow diagrams to use the visual flow editor module 205, to collectively contribute to computer code (e.g., IVR computer code 905) that is ultimately loaded into the IVR system. After the computer code is loaded, the IVR system can implement the IVR call flows that were created by the designers using their respective editor modules.

Figure 10:
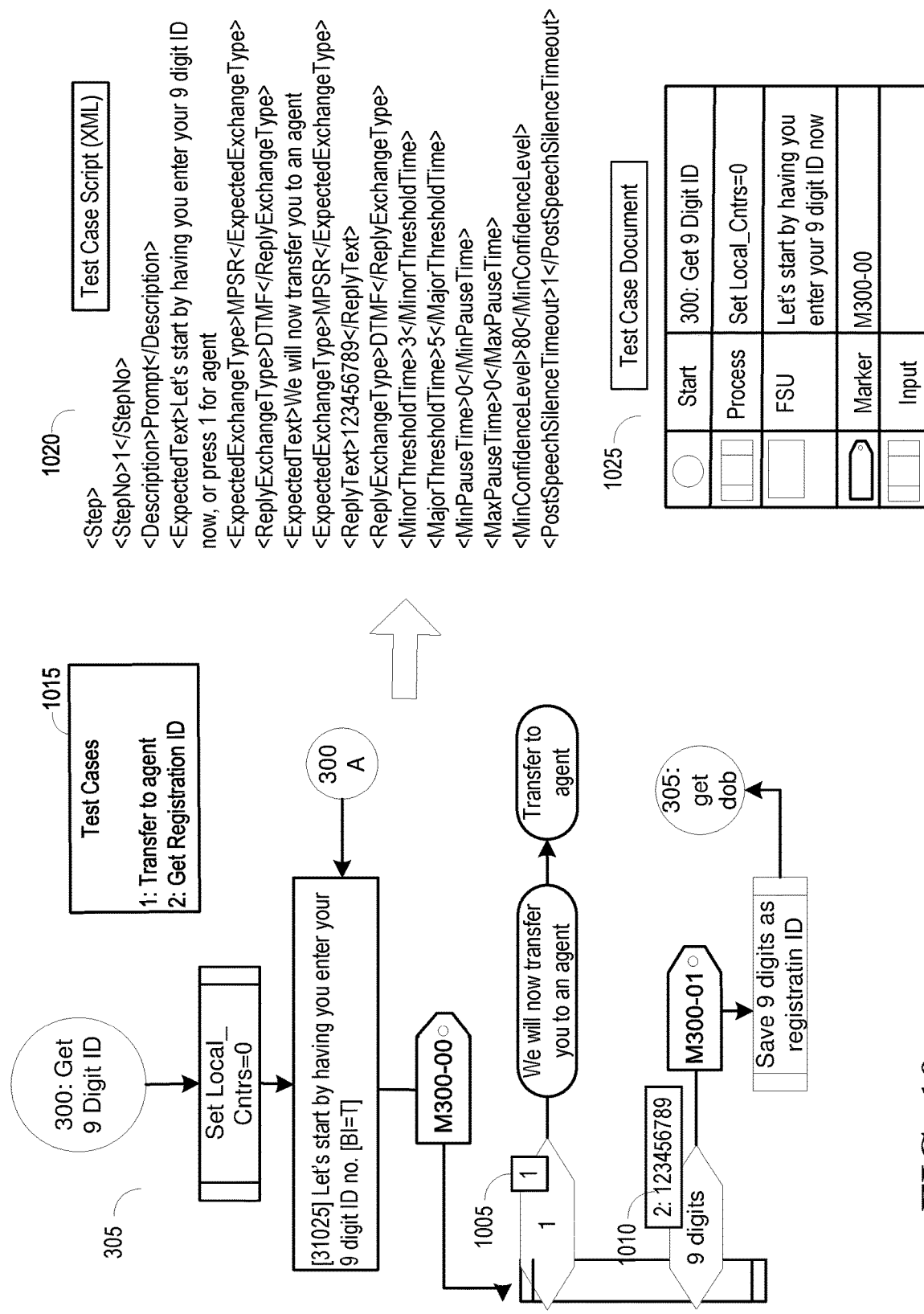
FIG. 10 illustrates the generation, by a test editor module and script generator module of the DDT tool, of test case script readable by an automated dialing and response system (referred to herein as an IVR testing bot), in accordance with various aspects and example embodiments of the subject invention.

Moving on to FIG. 10, the test editor module 250 and script generator module 255 can be used to create and generate test case script that can be used to direct an automated dialing and response system (referred to herein as an IVR testing bot) designed to respond to IVR systems (an example of such an automated dialing and response system is the Cyara Platform, which can, using the script, place calls as though it were coming from unique callers into the IVR system). Typically, testers desire to test each branch, or path, of an IVR call flow, and the test editor module 250 and script generator module 255 provides a module that enables the testing of multiple responses into the IVR system. In example embodiments, the test editor module 250 allows for test cases script inserts (also referred to herein as "crumbs") to be inserted (or dropped) on top of the relevant nodes of a call flow diagram (e.g., call flow diagram 305), and in example embodiments, the crumbs can be a layered above the call flow, and processed by the script generator module 255. In example embodiments, a crumb can be inserted by selecting a visual representation of a crumb (e.g., double-clicking it), which drops the crumb into the call flow diagram (e.g., call flow diagram 305), and even auto-numbers the crumb. In example embodiments, a crumb contains the number of the crumb, and also the step in the call flow diagram to which the crumb relates. In example embodiments, a placed crumb marks the path of the test case, and in doing so, indicates to the IVR testing bot which branch, or path, of the IVR call flow to test. Additionally, the crumbs can be used to indicate what inputs the IVR testing bot should input in response to a prompt, and what prompts it should expect to hear in response to its inputs, when interacting with the IVR system. A crumb that is placed can, for example, modify the expected wording heard by (e.g., received and processed by) the IVR testing bot, including different pronunciations of a work. The crumb can also provide an indication as to the timing in which a verbal segment of a prompt is presented. Examples below illustrate these uses.

As shown in the example of FIG. 10, if a developer places a crumb, referred to as test case 1 crumb 1005 on a choice node wherein the caller presses the "1" button), this would result in the generation of test script that, when read by the IVR testing bot, results in the IVR testing bot choosing to test the path corresponding a caller pressing the "1" button on the caller's UE. The crumb placed the branch related to a "1" input indicates to the IVR testing bot that when it encounters a prompt associated with that choice node, it can input a "1" in response to the prompt (the crumb can thus be thought of as taking the value of that choice node (e.g., "1") as its input. The purpose of the IVR testing bot is to provide input into the IVR system, and determine whether the correct response (which may be an informative prompt, or a prompt soliciting an input from the caller) is provided to the IVR testing bot in response to its input. Thus, when the IVR testing bot reads the test case script with the test case 1 crumb 1005 embedded in the script, it inputs a DTMF "1" into the system when presented by the appropriate prompt, the IVR is listening for a particular sound. The IVR testing bot, in the example, is expecting to receive back the audio response from the IVR system, "We will now transfer you to an agent." If the IVR testing bot "hears" different wording from it expects (e.g., it determines that the audio prompt it received from the IVR system does not match what it has as on record), that can indicate that the IVR system is not operating properly, or was improperly coded.

For illustrative purposes, FIG. 10 shows test case 2 crumb 1010, inserted onto the call flow diagram 305. For test case 2 crumb 1010, the designers have put in digits into the crumb, e.g., 123456789, so that the numerals would be used in the test case script 1010, which would ultimately be used in testing by the IVR testing bot. Each bread crumb can accommodate multiple numbers. For example, a tester can, using the test editor module 250, put into test case 2 crumb 1010 "123456789, 2344545095, 2342342342," etc. The script generator module 255 can process the crumbs with the IVR call flow diagram to generate a script for use by the IVR testing bot. Here, when the IVR system implementing the call flow prompts a user for a nine digit response, the IVR testing bot uses the numbers that were inserted into test case 2 crumb 1010 to respond to the IVR prompt asking a caller to enter in a nine digit number. The crumb is thus able to be used to provide a response, or multiple responses, to the IVR call flow, so that a tester need not call the IVR 50 fifty times to input fifty, nine digit numbers, to determine if the system is working properly.

In example embodiments, a crumb that overlays a prompt can be used to instruct an IVR testing bot to listen for a particular sound. As an example, an audio prompt might be created such that a voice might pronounce "ASCII" as "ask key." If an IVR testing bot is not instructed to listen for "ask key" it may instead be listening for the prompt to contain the sound "ay ess see eye eye." Using the test editor module 250 a crumb can be inserted that instructs the IVT testing bot to listen for the sound "ask key" instead, so that the IVR testing bot does not report an error when the pronunciation of a word is not in alignment with the IVR testing bot's expectations based on standard pronunciations. Thus, crumbs on prompts can be used to instruct an IVR testing bot what to listen for, or to listen for a particular sound. As such, they can be used to modify the expected wording or pronunciation that the IVR testing bot is supposed to hear.

In example embodiments, a bread crumb over a prompt can also be used to account for timing, for example, instruct an IVR testing bot to listen for pauses in a prompt. For example, a prompt should say "press 1" pause, and "press 2" pause. The crumb can instruct the IVR testing bot to listen to determine with a pause between segments has been made. Additionally, Crumbs can be used to delay entry of a number by the IVR testing bot, can be used to enter each number slowly, and thus modify timing elements related to what the IVR testing bot inputs, and what it hears.

In example embodiments, a crumb can be placed on an NINM node. An IVR testing bot processes this crumb related to the NINM node by inputting into the IVR system any response that is not a valid choice (e.g., that doesn't match a response the IVR system is expecting, e.g., directing the IVR testing bot to enter a 5 when the IVR system only expects numbers from 1 to 4. Or, a crumb on a NINM node can be configured to provide no response—e.g., wait a specified amount of time (e.g., corresponding to "no input" by a caller) to test what the IVR system will do in response to no input.

Crumbs can also be placed on result nodes, which results in test case script that directs the IVR testing bot to test the particular path related to the result node on which the crumb was placed.

Thus, in example embodiments, crumbs can be placed to overlay choice nodes, result nodes, prompts to test specific scenarios.

The test editor module 250 can generate a test cases dialog box 1015 in a GUI. In example embodiments, the test cases dialogue box can be a master index of all the crumbs that were inserted into the call flow, numbered in a particular order (e.g., numerically).

Thus, in example embodiments, the test editor module 250 and script generator module 255 allows for the provision of crumbs and the generation of a script (e.g., test case script 1010), and IVR testing bot can read and implement the test case script 1010, instead of the script being handed to live person (e.g., a tester) that tests each branch, with the instructions to type in fifty numbers at a prompt, to test whether the IVR processes the numbers successfully at that prompt. Subsequently, a test case log 1025 can be generated that shows each node that the IVR testing bot tested, including any responses that the IVR testing bot input into the system to test it (e.g., 9 digits DTMF (TestData=12345678).

Now referring to FIG. 11, an application log module 260 and application log scanner module 265 can be operable to provide and provide analysis of the processes, or operations, that are being performed by an IVR system (e.g., IVR system 104), including those that are not perceived by a caller (e.g., behind the scenes operations), including decisions, markers, counts associated with markers, selection of prompts based on caller responses, implementation of go-to processes, etc. An application log file can be generated, e.g., by application log module 260, of all IVR operations that are being performed, including the behind-the-scenes processing of data. Application log scanner module 265 can be operable to analyze the application log file generated by the application log module 260. For example, when markers are encountered by callers, the counts are recorded into the application log file. The application log scanner module 265 can be operable to determine whether markers have been misplaced. It can determine whether the markers are in the right sequence, in the right place, and encountered at the right time. The application log scanner module 265 scans the application log file, and generates an application log report, e.g., application log report 1105 as shown in FIG. 10. In example embodiments, check marks associated with log entries indicate that there are no errors in placement, sequence, or call flow, whereas squares can indicate there might be a problem with, for example, a node. For example, as shown in the application log report 1105, Marker M050-89 was placed in the incorrect unit, and an indicator (e.g., square) on the application log report 1105 provides a warning of the error, while the notes in the application log report 1105 indicates that Marker M050-89 should have been placed in "Previous Unit 50," which was a different node from the node in which it was placed.

Figure 14:
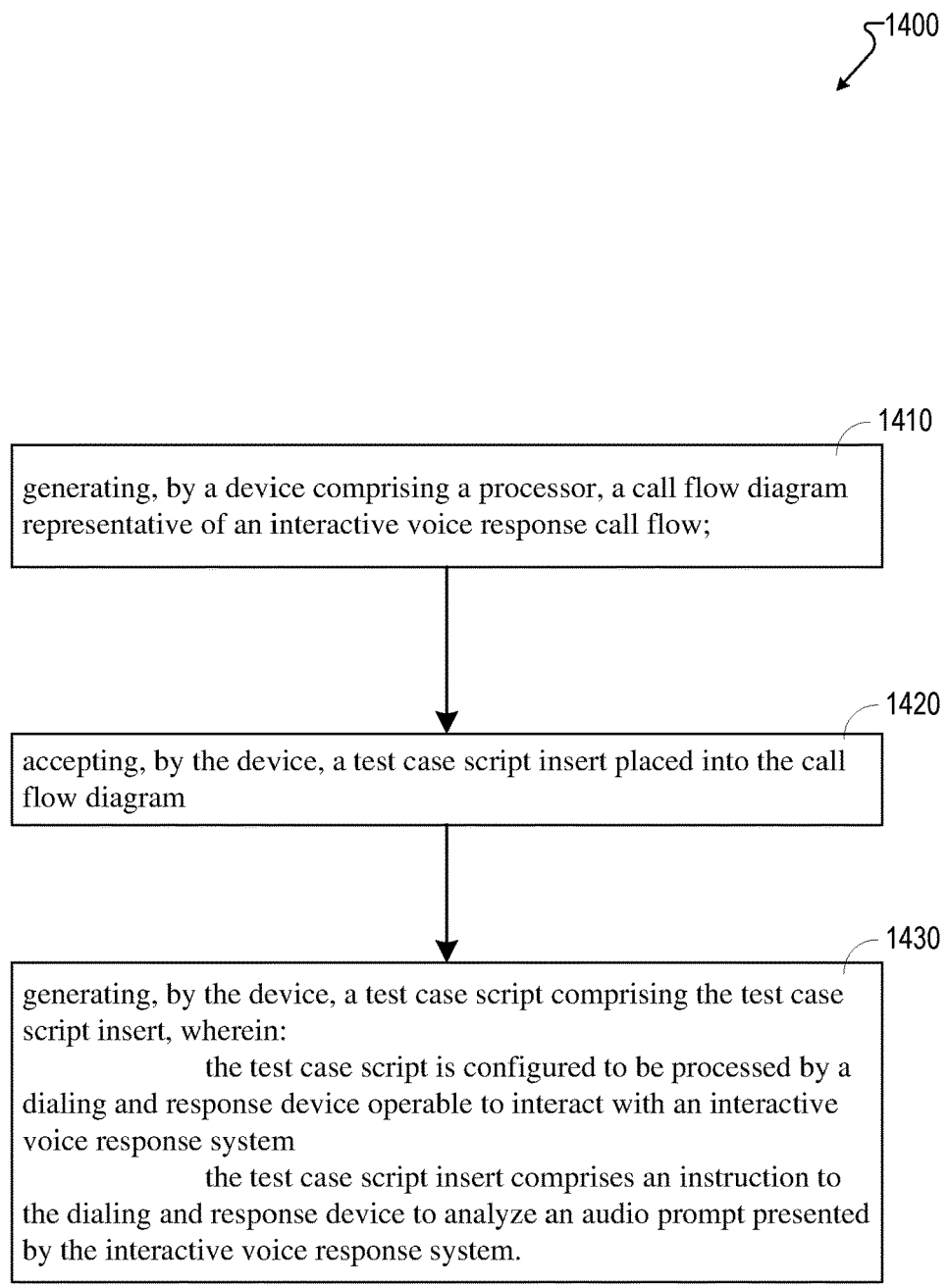
FIG. 14 illustrates another example block diagram of example operations that relate to the insertion and processing of test cast script inserts, in accordance with various aspects and example embodiments of the present invention.
Figure 15:
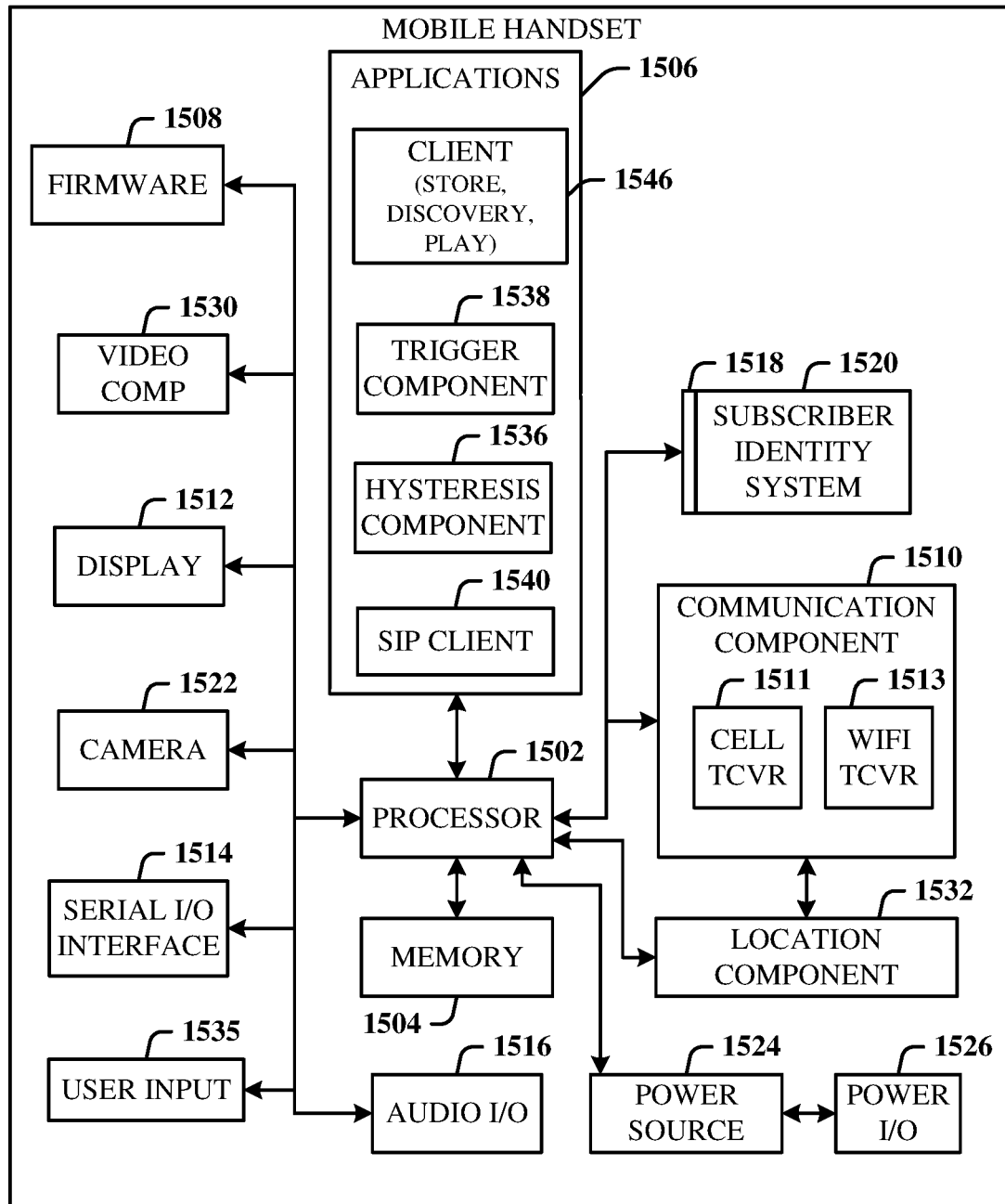
FIG. 15 illustrates an example block diagram of a mobile handset that can be operable to execute processes and methods described herein, in accordance with various aspects and example embodiments of the present invention.

In example embodiments, a device (e.g., one or more device, e.g., with circuitry as shown in FIG. 14 and FIG. 15)s, which may be networked), comprising a processor and a machine-readable storage medium (e.g., memory) that stores executable instructions that, when executed by the processor, can facilitate performance of operations, including those operations/methods as described above, and also below in FIGS. 12, 13, and 14.

Figure 12:
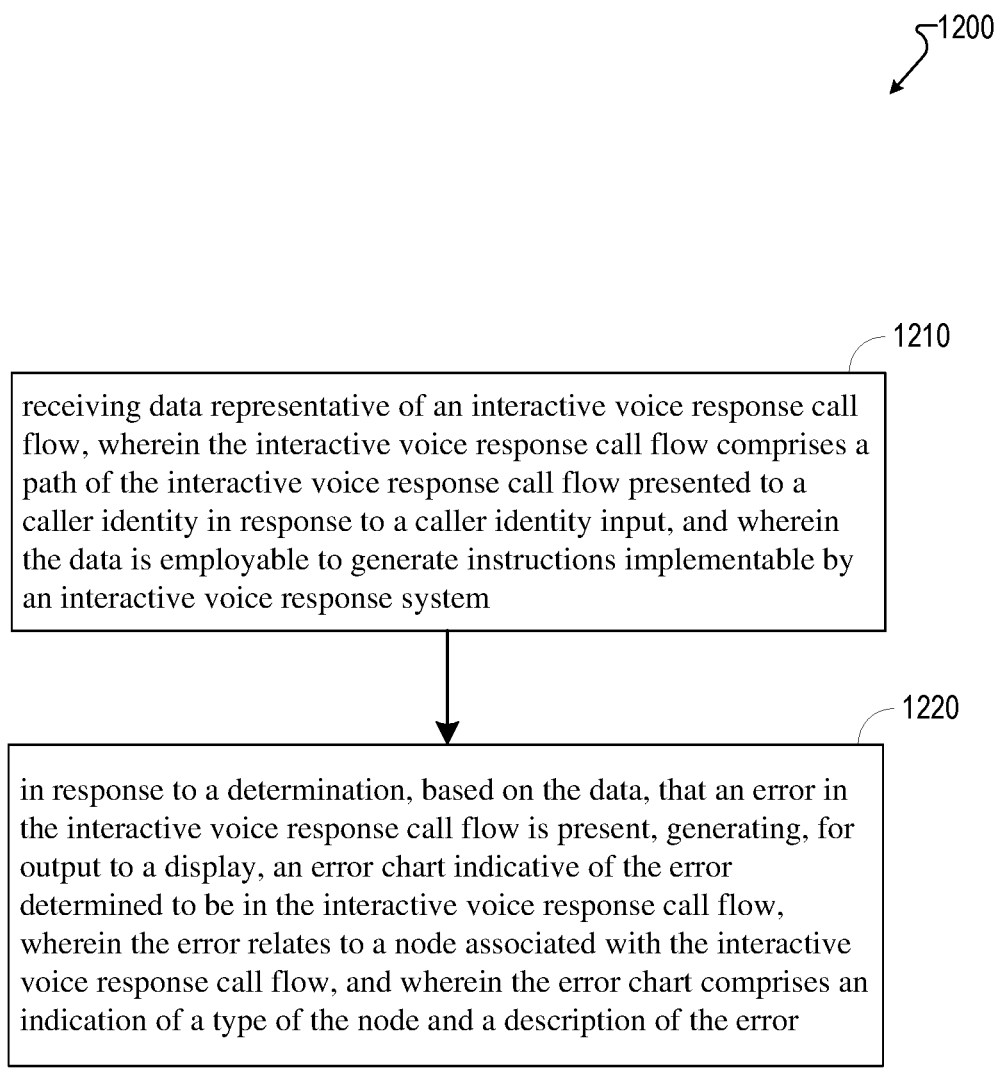
FIG. 12 illustrates an example block diagram of example operations that can be performed by a DDT tool related to the functionality of the flow analyzer, in accordance with various aspects and example embodiments of the present invention.

FIG. 12 illustrates a flow diagram 1200 depicting example operations that can be performed, for example, by a computing device (e.g., a computing device comprising DDT tool 118 and its various modules, e.g., flow analyzer module 230) in accordance with example embodiments of the present invention.

At block 1210, the operations can comprise receiving data representative of an interactive voice response call flow, wherein the interactive voice response call flow comprises a path of the interactive voice response call flow presented to a caller identity in response to a caller identity input, and wherein the data is employable to generate instructions implementable by an interactive voice response system (e.g., IVR system 104).

At block 1220, the operations can comprise in response to a determination, based on the data, that an error in the interactive voice response call flow is present, generating, for output to a display, an error chart (e.g., error chart 605) indicative of the error determined to be in the interactive voice response call flow, wherein the error relates to a node associated with the interactive voice response call flow, and wherein the error chart comprises an indication of a type of the node, and a description of the error (see, e.g., FIG. 6 and related text).

Still referring to FIG. 12, the data can be generated based on the call flow diagram data representative of the interactive voice response call flow. The call flow diagram data can comprise graphical data indicative of a visual representation of the node. The visual representation can be selectable from an electronic palette (e.g., visual flow editor palette 315) displayed on a graphical user interface (e.g., visual flow editor GUI 300) for insertion into the call flow diagram data. In example embodiments, a selectable portion of the description, when selected by an action ascribed to a user identity (e.g., a developer), results in the output to the display of a visual indicator of the error nearby the visual representation of the node (see, e.g., FIG. 6). The error chart further comprises alphanumeric text representative of a proposed remedy for the error (see, e.g., FIG. 6). The error can relate to a rule (e.g., one or more rules) for the use of the type of the node. The type of the node can comprise a decision node representative of an assessment of a state of the interactive voice response call flow. The assessment of the state can comprise determining whether a data element is present in the interactive voice response call flow. The type of node can comprise a choice node representative of the caller identity input.

Figure 13:
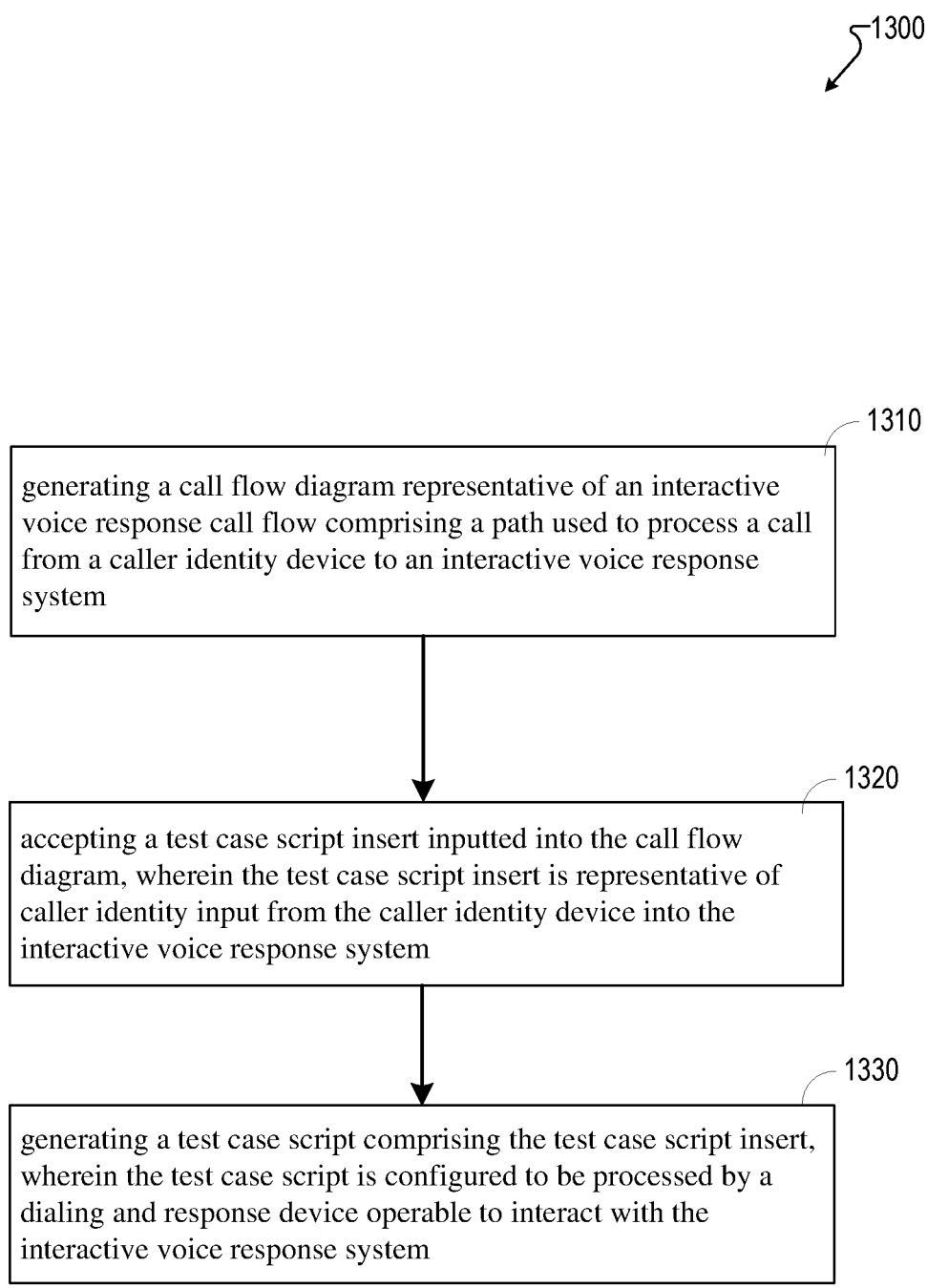
FIG. 13 illustrates an example block diagram of example operations that relate to the insertion and processing of test cast script inserts, in accordance with various aspects and example embodiments of the present invention.

FIG. 13 illustrates another flow diagram of example operations 1300 that can be performed, for example, by a computing device (e.g., a computing device comprising DDT tool 118 and its various modules) in accordance with example embodiments of the present invention.

At block 1310, the operations can comprise generating a call flow diagram (e.g., call flow diagram 305) representative of an interactive voice response call flow comprising a path used to process a call from a caller identity device (e.g., UE 102) to an interactive voice response system (e.g., IVR system 104).

At block 1320, the operations can further comprise accepting a test case script insert (e.g., test case 2 crumb 1010) inputted into the call flow diagram, wherein the test case script insert is representative of caller identity input (e.g., in the form of DTMF signals) from the caller identity device into the interactive voice response system.

At block 1330, the operations can comprise generating a test case script (e.g., test case script 1010) comprising the test case script insert, wherein the test case script is configured to be processed by a dialing and response device (e.g., IVR testing bot, e.g., Cyara Platform) operable to interact with the interactive voice response system.

Still referring to FIG. 13, the test case script insert can overlay a visual representation of a node (e.g., nodes $310_{1-N}$) of the call flow diagram. The type of the node can comprise, for example, a choice node representative of the caller identity input. The operations further can comprise generating a log representative of a sequence of operations performed by the dialing and response device based on the test case script, and wherein the sequence of operations comprises the caller identity input related to the test case script insert.

FIG. 14 illustrates another flow diagram of example operations 1400 that can be performed, for example, by a computing device (e.g., a computing device comprising DDT tool 118 and its various modules) in accordance with example embodiments of the present invention.

The operations can comprise, at block 1410, generating, by a device comprising a processor, a call flow diagram (e.g., call flow diagram 305) representative of an interactive voice response call flow. Data representative of the call flow diagram is used to generate computer code executable by an interactive voice response system.

The operations at block 1420 can further comprise, accepting, by the device, a test case script insert (e.g., a crumb) placed into the call flow diagram.

The operations can further comprise, at block 1430, generating, by the device, a test case script (e.g., test case script 1020) comprising the test case script insert, wherein the test case script is configured to be processed by a dialing and response device (e.g., IVR testing bot) operable to interact with the interactive voice response system (e.g., IVR system 104), and wherein the test case script insert comprises an instruction to the dialing and response device to analyze an audio prompt (e.g., "listen" to a prompt) presented by the interactive voice response system. For example, the instruction can comprise an instruction to the dialing and response device to determine whether the audio prompt contains a pause (e.g., as described above, a prompt can be designed to have a pause between the options presented to a user; the instruction directs an IVR testing bot to listen to the prompt and determine whether there is a pause). The instruction can comprise an instruction to the dialing and response system to modify an analysis of the audio prompt based on a pronunciation of the audio prompt (e.g., as described above, listen for a pronunciation of a word or acronym, e.g., listen for "ask key" instead of "ay ess see eye eye.").

Referring now to FIG. 15, illustrated is a schematic block diagram of an example end-user device such as a user equipment (e.g., UE 102) that can be a mobile handset 1500 capable of dialing into and responding to an IVT system (e.g., IVR system 104), in accordance with example embodiments described herein. One or more of the components as illustrated in FIG. 15 can comprise the user equipment, and although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1500 comprises a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 comprises a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communications component 1510 to accommodate IP traffic from an IP network such as, for example, the Internet, a corporate intranet, a home network, a person area network, etc., through an ISP or broadband cable provider. Thus, VoIP traffic can be utilized by the handset 1500 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also comprises a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1536 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, comprises an indoor network radio transceiver 1513 (e.g., Wi-Fi transceiver). This function supports the indoor radio link, such as IEEE 802.11, for a dual-mode GSM handset. The handset 1500 can accommodate at least satellite radio services through a handset that can combine wireless voice and digital radio chipsets into a single handheld device.

Figure 16:
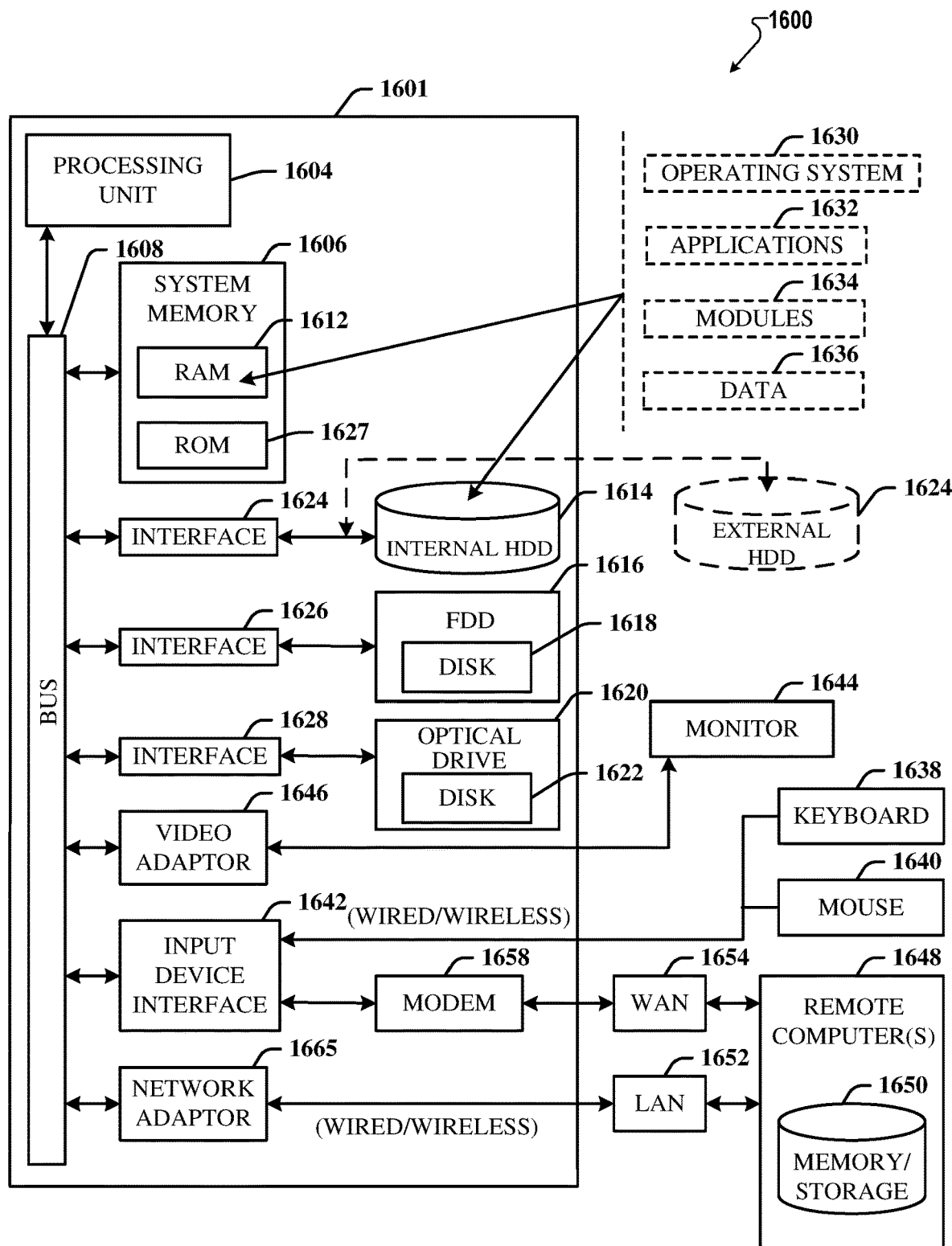
FIG. 16 illustrates an example block diagram of a computer that can be operable to execute processes and methods described herein, in accordance with various aspects and example embodiments of the present invention.

Referring now to FIG. 16, there is illustrated a block diagram of a computer 1600 operable to execute the functions and operations performed in the described example embodiments (e.g., a computing device executing one or more modules of the DDT tool 118). The computer 1600 can provide networking and communication capabilities between a wired or wireless communication network and a server and/or communication device. In order to provide additional context for various aspects thereof, FIG. 16 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows:

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 16, implementing various aspects and example embodiments described herein, devices (e.g., MNO network devices, network node devices) can include a computer 1600, the computer 1600 comprising a processing unit 1604, a system memory 1606 and a system bus 1608. The system bus 1608 couples system components comprising the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 comprises read-only memory (ROM) 1627 and random access memory (RAM) 1612. A basic input/output system (BIOS) is stored in a non-volatile memory 1627 such as ROM, EPROM, EEPROM, which BIOS contains the basic routines that help to transfer information between elements within the computer 1600, such as during start-up. The RAM 1612 can also include a high-speed RAM such as static RAM for caching data.

The computer 1600 further comprises an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1600, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1612, comprising an operating system 1630, one or more application programs 1632, other program modules 1634 and program data 1636. All or portions of the operating system, applications, modules, and/or data can also be cached in the RAM 1612. It is to be appreciated that the embodiments can be implemented with various commercially available operating systems or combinations of operating systems.

A user can enter commands and information into the computer 1600 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 2394 serial port, a game port, a USB port, an IR interface, etc.

A monitor 1644 or other type of display device is also connected to the system bus 1608 through an interface, such as a video adapter 1646. In addition to the monitor 1644, a computer 1600 typically comprises other peripheral output devices (not shown), such as speakers, printers, etc.

The computer 1600 can operate in a networked environment using logical connections by wired and/or wireless communications to one or more remote computers, such as a remote computer(s) 1648. The remote computer(s) 1648 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1600 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1600 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 through the input device interface 1642. In a networked environment, program modules depicted relative to the computer, or portions thereof, can be stored in the remote memory/storage device 1650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component (s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A device, comprising:
    a processor; and
    a memory that stores executable instructions that, when executed by the processor, facilitate performance of operations, comprising:
        receiving first data representative of an interactive voice response call flow, wherein the interactive voice response call flow comprises a path of the interactive voice response call flow presented to a caller identity in response to a caller identity input, and wherein the first data is employable to generate first instructions implementable by an interactive voice response system;
        generating a graphical user interface that renders a rendering of the interactive voice call flow from the first data representative of the interactive voice response call flow;
        receiving first user input via the graphical user interface, the user input indicative of a modification of a graphical element of the graphical user interface;
        receiving second user input indicative of modifying a state diagram that is employable to generate the first instructions, the second user input being received independent of the rendering of the interactive voice call flow;
        based on the first user input indicative of the modification of the graphical element of the graphical user interface, and based on the second user input of the modification of the state diagram, generating second data representative of a modified interactive voice response call flow comprising the modification; and
        based on the second data, generating second instructions implementable by the interactive voice response system.

2. The device of claim 1, wherein the operations further comprise:
    in response to a determination, based on the first data, that an error in the interactive voice response call flow is present, generating, for output to a display, an error chart indicative of the error determined to be in the interactive voice response call flow, wherein the error relates to a node associated with the interactive voice response call flow, and wherein the error chart comprises an indication of a type of the node and a description of the error.

3. The device of claim 1, wherein the graphical user interface comprises graphical data indicative of a visual representation of a node of the interactive voice call flow.

4. The device of claim 3, wherein the visual representation is selectable from an electronic palette displayed on a graphical user interface for insertion into the graphical data.

5. The device of claim 3, wherein a selectable portion of a description of an error determined to be present in the interactive voice response call flow, when selected by an action ascribed to a user identity, results in the output to the display of a visual indicator of the error nearby the visual representation of the node.

6. The device of claim 1, wherein a type of node of the interactive voice call flow comprises a decision node representative of an assessment of a state of the interactive voice response call flow.

7. The device of claim 6, wherein the assessment of the state comprises determining whether a data element is present in the interactive voice response call flow.

8. The device of claim 1, wherein a type of node of the interactive voice call flow comprises a choice node representative of the caller identity input.

9. The device of claim 1, wherein the generating of the second instructions comprises:

generating a first group of the second instructions based on the second data; and generating a second group of the second instructions based on the state table data, the first group being distinct from the second group.

10. A non-transitory machine-readable medium, comprising executable instructions that, when executed by a processor, facilitate performance of operations, comprising:

receiving first data representative of an interactive voice response call flow, wherein the first data is employable to generate first instructions implementable by an interactive voice response system;

generating a graphical user interface that renders the interactive voice call flow from the first data representative of the interactive voice response call flow, resulting in a rendering of the interactive voice call flow;

receiving first user input via the graphical user interface, the first user input indicative of a first modification of a graphical element of the graphical user interface;

receiving second user input indicative of a second modification to a state diagram that is employable to generate the first instructions, the second user input being received independent of the rendering of the interactive voice call flow;

based on the first user input indicative of the first modification of the graphical element of the graphical user interface, and based on the second user input of the second modification of the state diagram, generating second data representative of a modified interactive voice response call flow comprising the first modification and the second modification; and based on the second data, generating second instructions implementable by the interactive voice response system.

11. The non-transitory machine-readable medium of claim 10, wherein generating the second instructions comprises:

generating a first group of the second instructions based on the second data; and generating a second group of the second instructions based on the state table data, the first group being distinct from the second group.

12. The non-transitory machine-readable medium of claim 10, wherein the operations further comprise:

in response to a determination, based on the first data, that an error in the interactive voice response call flow is present, generating, for output to a display, an error chart indicative of the error determined to be in the interactive voice response call flow, wherein the error relates to a node associated with the interactive voice response call flow, and wherein the error chart comprises an indication of a type of the node and a description of the error.

13. The non-transitory machine-readable medium of claim 11, wherein the graphical user interface comprises graphical data indicative of a visual representation of the node.

14. The non-transitory machine-readable medium of claim 13, wherein the visual representation is selectable from an electronic palette displayed on a graphical user interface for insertion into the graphical data.

15. The non-transitory machine-readable medium of claim 13, wherein a selectable portion of a description of an error determined to be present in the interactive voice response call flow, when selected via an action ascribed to a user identity, results in the output to the display of a visual indicator of the error nearby the visual representation of the node.

16. A method, comprising:

receiving, by a system comprising a processor, first user input via a graphical user interface that renders an interactive voice call flow, the first user input indicative of a modification of a graphical element of the graphical user interface, add wherein a type of a node of the interactive voice call flow comprises a decision type of node representative of an assessment of a state of the interactive voice response call flow, and wherein the assessment of the state comprises determining whether a data element is present in the interactive voice response call flow;

receiving, by the system, second user input indicative of a first instruction to modify a state diagram that represents the interactive voice call flow; and based on the first user input and the second user input, generating, by the system, second instructions implementable by an interactive voice response system.

17. The method of claim 16, wherein the generating of the second instructions comprises:

generating a first group of the second instructions based on the first user input; and generating a second group of the second instructions based on the second user input, the first group being different than the second group.

18. The method of claim 16, wherein the decision type of node of the interactive voice call flow comprises a choice type of node representative of the caller identity input.

19. The method of claim 16, further comprising:

in response to a determination that an error in the interactive voice response call flow is present, generating, by the system, for output to a display, an error chart indicative of the error determined to be in the interactive voice response call flow, wherein the error relates to a node associated with the interactive voice response call flow, and wherein the error chart comprises an indication of a type of the node and a description of the error.

20. The method of claim 16, wherein the graphical user interface comprises graphical data indicative of a visual representation of a node of the interactive voice call flow.

* * * * *